United States Patent [19]
Nojima et al.

[11] Patent Number: 5,832,386
[45] Date of Patent: Nov. 3, 1998

[54] PORTABLE TELEPHONE SET WITH AUTOMATIC SOUND GENERATION WHEN IT IS DETECTED THAT THE SET IS WITHIN A SERVICE AREA OF A DESIRED PORTABLE COMMUNICATION APPARATUS

[75] Inventors: Osamu Nojima, Tachikawa; Noboru Yumoto, Fussa, both of Japan

[73] Assignee: Casio Computer Co., Ltd., Tokyo, Japan

[21] Appl. No.: 518,340

[22] Filed: Aug. 23, 1995

Related U.S. Application Data

[62] Division of Ser. No. 274,311, Jul. 13, 1994, Pat. No. 5,617,468.

[30] Foreign Application Priority Data

Jul. 15, 1993 [JP] Japan .................................... 5-198988

[51] Int. Cl.⁶ .................................................. H04Q 7/24
[52] U.S. Cl. ........................... 455/465; 455/421; 455/462; 455/567
[58] Field of Search .................................. 379/58, 60, 61, 379/210, 211, 212; 455/421, 415, 462, 465, 552, 553, 567, 461

[56] References Cited

U.S. PATENT DOCUMENTS

| | | | |
|---|---|---|---|
| 4,748,655 | 5/1988 | Thrower et al. | 455/461 |
| 4,853,951 | 8/1989 | Bauer | 455/421 |
| 4,881,259 | 11/1989 | Scordato . | |
| 4,989,230 | 1/1991 | Gillig et al. | 379/61 |
| 4,996,715 | 2/1991 | Marui | 455/33 |
| 5,127,042 | 6/1992 | Gillig | 379/59 |
| 5,210,785 | 5/1993 | Sato et al. . | |
| 5,233,641 | 8/1993 | Maeda | 379/58 |
| 5,259,021 | 11/1993 | Antilla | 379/58 |
| 5,379,339 | 1/1995 | Sakamoto | 379/211 |

FOREIGN PATENT DOCUMENTS

| | | | |
|---|---|---|---|
| 0563896 A1 | 10/1993 | European Pat. Off. . | |
| WO 94/05101 | 3/1994 | WIPO | 379/61 |

*Primary Examiner*—Dwayne D. Bost
*Assistant Examiner*—Myron K. Wyche
*Attorney, Agent, or Firm*—Frishauf, Holtz, Goodman, Langer & Chick

[57] ABSTRACT

A portable telecommunications apparatus which is capable of communicating with a destination communication apparatus, such as a public radio base station, through a radio telecommunications channel, including: a detector which detects if the portable telecommunication apparatus has entered a service area of the destination communication apparatus. A sound generator notifies a user by a sound when it is detected that the portable telecommunications apparatus has entered the service area of the destination communication apparatus, and a sounding mode setting device which sets a sounding mode in which the sound is generated by the sound generator when it is detected that the portable telecommunication apparatus has entered the service area of the destination communication apparatus. The portable telecommunication apparatus, which may be a portable telephone set, is provided with a setting device for setting a telephone number and a photo-sensor for sensing light so that the portable telecommunications apparatus calls the telephone number set by the setting device when the photo-sensor detects light within a predetermined period of time after the detection of when the portable telecommunications apparatus is located in the service area of a destination communication apparatus

12 Claims, 27 Drawing Sheets

FIG.4

| | | |
|---|---|---|
| 1 | 2 | 3 |
| 4 | 5 | 6 |
| 7 | 8 | 9 |
| ✶ | 0 | # |
| RE-PRODUC-TION | ERASURE | RECORD-ING |

23a: rows 1–4 (digits/symbols)
23b: bottom row (REPRODUCTION / ERASURE / RECORDING)

FIG.12 A  | TELEPHONE NUMBER | # | ID NUMBER | CONTROL INFORMATION |

FIG.12 B  | CONTROL INFORMATION |

PORTABLE TELEPHONE SET WITH AUTOMATIC SOUND GENERATION WHEN IT IS DETECTED THAT THE SET IS WITHIN A SERVICE AREA OF A DESIRED PORTABLE COMMUNICATION APPARATUS

This is a division of application Ser. No. 08/274,311 filed Jul. 13, 1994 U.S. Pat. No. 5,617,468.

BACKGROUND OF THE INVENTION

1. Field of the Invention

The present invention relates to a portable telephone set and a portable telecommunication apparatus to be suitably used for a second generation cordless telephone system and, more particularly, it relates to a telephone set and a portable telecommunication apparatus having a function of automatically determining if it is in or out of the service area.

2. Description of the Related Art

With the rapid development of digital technologies in recent years, mobile telecommunication systems using a digital communication scheme are becoming more and more popular instead of those using an analog communication scheme. The mobile telecommunication system necessarily involves exchange of control signals between radio base stations connected to a telecommunication network and portable telecommunication apparatuses belonging to the system. A basic system for realizing high efficient and high quality radio communications can be constructed by using digitized control signals. With the application of digital technologies to the mobile telecommunication system, both the radio base station and the portable telecommunication apparatuses can be downsized so that the portable telecommunication apparatuses may provide an enhanced level of portability.

Thus, the number of subscribers of portable telephone sets which is a kind of portable communication apparatus utilizing digital technologies are remarkably increasing. The digital communication system is free from the problems that conventional analog communication systems are hard to meet the increasing number of subscribers for mobile telecommunication systems because of restricted frequency allocation and have a deficiency of limited confidentiality. Recently, a second generation cordless telephone system utilizing widely such digital technologies has been intensively developed.

In the second generation cordless telephone system, a vast number of channels are created by limiting the effective area of each single portable telephone set to a small zone called micro cell and allocating repeatedly a single frequency band to different subscribers through the time division multiplex so that the limited number of frequency resources available for telecommunications can be effectively exploited. Since each zone (or cell) is made small, only a low output is required for the portable telephone set so that it may consume power at a reduced rate and can be constructed to be compact. Hence the telephone set can operate for a prolonged period and it can use a small size battery.

In the second generation cordless telephone system using portable telephone sets, telecommunication channels are established separately between portable telephone sets and a public radio base station connected to the telecommunication network and between the portable telephone set and a private radio base station set (a base station telephone set) which is the base station of the portable telephone set. A particular service area is assigned to the base station, where it can communicate with its portable telephone sets. The public radio base station can be called by any portable telephone sets whereas the private base station set can be called only by its portable telephone set.

In the second generation cordless telephone system, each portable telephone set can be used as an extension set (child set) of a base station set (parent set) of a conventional telephone system having an automatic answering function. The portable telephone set, on its part, is provided with a remote control function, with which, for example, it can obtain messages stored in the base station set during the subscribers' absence by operating remotely the automatic answering function of the base station set in the home from the portable telephone set.

On the other hand, the base station set can also be accessed from and controlled by a public telephone set. If such is the case, a particular identification number which is used to determine whether the remote operation from the public telephone set is allowed is normally registered in the base station set in advance. Then, the subscriber who owns the base station set and hence knows the identification number and the key number corresponding to a function to be operated by the remote operation can successfully obtain the stored message during the subscriber's absence, by calling the base station set through the public telephone set which can transmit the tone signal and then inputting the identification number to the base station set and operating the key number which corresponds to a function to be operated.

However, in case of a portable telephone set which is used in the second generation cordless telephone system and is also used at home as an extension set of a base station set of a conventional telephone system, when an automatic answering function etc. of the base station set is used by means of a remote control operation, two different modes of operation are required for users to use it, one for remotely controlling the base station set having an automatic answering function outside of home and the other for using it at home. Then, the subscriber has to memorize two different sets of procedures for remotely controlling the base station set in two different modes, demanding troublesome remote control procedures to the subscriber, which are hard for the subscriber to remember.

A portable telephone set is normally provided with a display screen that displays an "OUT-OF THE SERVICE AREA" message when it has moved out of the service area of the public radio base station, telling that no telecommunications channel can be established between them any more. When the portable telephone set returns to the service area, the display is cleared to tell that it can now call the base station or vice versa.

Thus, unless the subscriber carrying the portable telephone set always checks the display screen, the subscriber cannot know if he or she is in the service area of the radio base station whenever the subscriber is moving with the portable telephone set.

As a kind of portable communication apparatus, there is a transceiver which can communicate by directly transmitting and receiving radio signals. However, when the destination transceiver is not in the neighborhood, the transceiver requires the user to call the destination transceiver frequently to determine whether or not the destination transceiver is located within its service area since the service area of the transceiver is normally very small. Thus a serious inconvenience is caused to operate the transceiver.

In the second generation cordless telephone system, each portable telephone set is required to have a transceiver function so that a communication channel may be established between any two portable telephone sets without the radio base station if they are located within their service areas. However, since the antenna power of a portable telephone set of the second generation cordless telephone system is limited as low as less than 10 milliwatts, the service areas of the portable telephone sets would be limited to a narrow range having a radius as small as 50 to 100 meters.

Any known portable telephone set that can operate as a transceiver has to have its transceiver function canceled to return to a normal portable telephone set or move around to enter the service area of the destination telephone set, if it has moved out of the service area of the destination portable telephone set and needs to contact with the destination portable telephone set immediately while it is operating as a transceiver.

SUMMARY OF THE INVENTION

It is therefore an object of the present invention to provide a portable telephone set to be used for a second generation cordless telephone system in which substantially identical remote operations for function added to the base station set of a first generation cordless telephone system can be utilized at home and outside home thus simplifying the remote operation of the base station set outside home.

It is another object of the present invention to provide a portable telephone set with which the user can easily find out if the user enters the service area of the radio base station to establish a telecommunications channel with the radio base station.

It is still another object of the present invention to provide a portable telephone set equipped with a transceiver function with which the destination telephone set can be called without fail.

According to an aspect of the present invention, there is provided a portable telephone set capable of establishing a telecommunications channel with a public radio base station connected to a telecommunications network and a base station telephone set, the portable telephone set comprising: an input means for remotely controlling the base station telephone set; a determination means for determining if the portable telephone set is within or out of the service area of the base station telephone set; and a control means for transmitting a remote control signal corresponding to the operation to be carried out by remote control to the base station telephone set via the public radio base station and the telecommunications network to remotely control the base station telephone set by the input means if it is determined by the determination means that the portable telephone set is out of the service area of the base station telephone set.

According to another aspect of the invention, there is provided a portable telecommunications apparatus capable of communicating with a destination communication apparatus through a radio telecommunications channel, comprising: a detection means for detecting if the portable telecommunication apparatus has entered the service area of the destination communication apparatus; and a sound means for notifying a user by a sound when it is detected by the detection means that the portable telecommunication apparatus has entered the service area of the destination communication apparatus.

According to still another aspect of the invention, there is provided a portable telephone set having a direct communication function of directly exchanging radio signals with a destination portable telephone set and capable of establishing a telecommunications channel with a radio base station connected to a telecommunications network characterized in that the portable telephone set calls the destination portable set via the radio base station and the telecommunications network if the destination portable telephone set does not respond when the destination portable telephone set is directly called by the direct communication function.

In the present invention, a portable telephone set can simply conduct a remote control of the base station telephone set out of the service area of the base station telephone set, notifies the user whenever the user has entered the service area of the destination communication apparatus and can call the destination telephone set without fail by means of the transceiver function with which the portable telephone set is provided.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a schematic plan view of the key input section of the portable telephone set of FIG. 3;

FIGS. 12A and 12B are schematic illustrations of the configuration of a signal to be transmitted when the portable telephone set of FIG. 5 is used to remotely control the base station telephone set within the service area of the public telecommunications network;

FIG. 15 is a flowchart for the processing operation of the controller of FIG. 13 to cause the sound means to emit a sound signal and indicate if the portable telephone set is located within or out of the service area of the radio base station when the power switch is turned on;

FIG. 16 is a flowchart for the processing operation of the controller of FIG. 13 to cause the sound means to emit a sound signal and indicate if the portable telephone set is located within or out of the service area of the radio base station when the notification mode switch is turned on;

FIG. 17 is a flowchart for an alternative processing operation of the controller of FIG. 13 to cause the sound means to emit a sound signal and indicate if the portable telephone set is located within or out of the service area of the radio base station when the notification mode switch is turned on;

DETAILED DESCRIPTION OF THE PREFERRED EMBODIMENTS

Embodiments of the present invention will be described in greater detail by referring to the accompanying drawings.

(First Embodiment)

FIGS. 1 through 12 illustrate a preferred first embodiment of portable telephone set according to the present invention to be suitably used for a second generation cordless telephone system.

Figure 1:
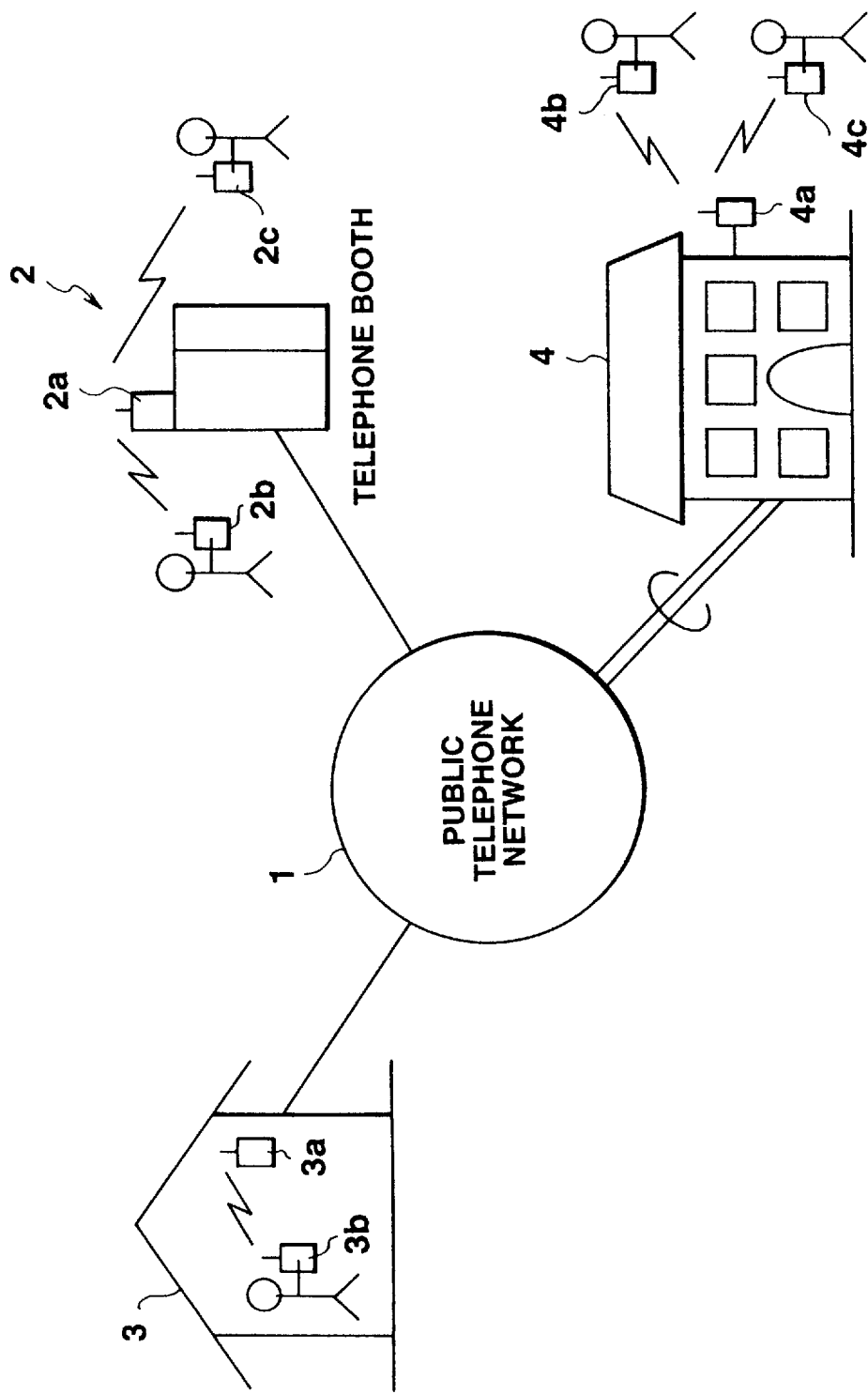
FIG. 1 is a schematic illustration of a first embodiment of portable telephone sets according to the present invention incorporated in a second generation cordless telephone system.

FIG. 1 illustrates a schematic view of a second generation cordless telephone system. First the overall configuration of the system will be described. Referring to FIG. 1, a second generation cordless telephone system typically comprises a public telephone (telecommunication) network 1 and a large number of public radio base stations installed in public facilities such as public telephone booth 2 and railway stations 4, and base station telephone sets installed in subscribers' homes 3. The public radio base stations 2a and 4a of public telephone booths 2 and railway stations 4 and the base station sets 3a of subscribers' homes 3 are connected to the network 1. Each of the public base stations 2a and 4a of public telephone booths 2 and railway stations 4 is accessible to a number of portable telephone sets 2b, 2c or 4b, 4c that are affiliated to it while each of the base station telephone sets 3a is accessible only to its portable telephone set 3b. Additionally, public radio base stations 2a and 4a are accessible to portable telephone sets 3b, as well as the portable telephone sets 2b, 2c, 4b and 4c, when the portable sets 3b are out of their respective homes. The public telephone network 1 may be a PSTN (Public Services Telephone Network) or an ISDN (Integrated Services Digital Network).

Figure 2:
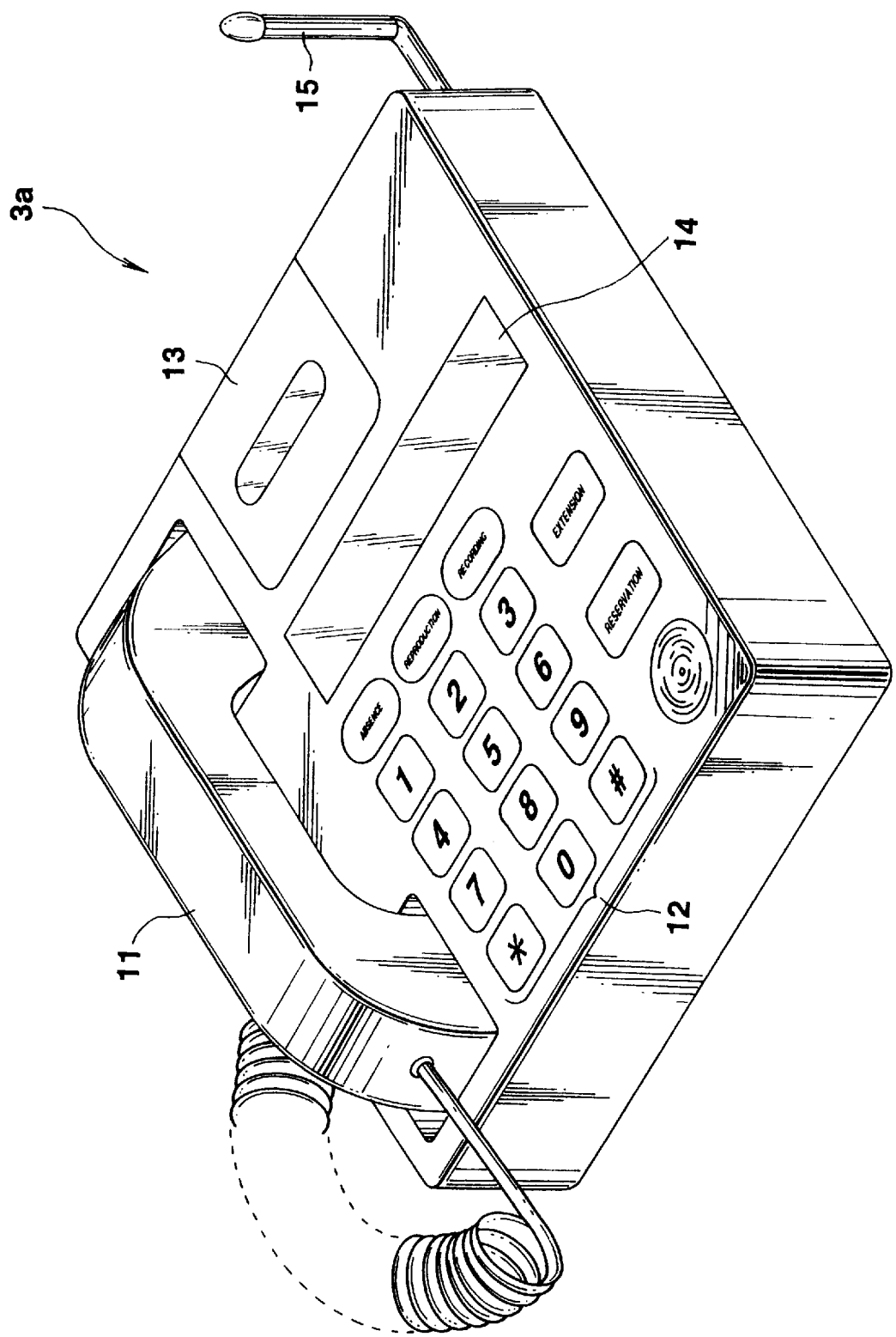
FIG. 2 is a schematic perspective view of a base station telephone set to be installed in a subscriber's home of the second generation cordless telephone system shown in FIG. 1.

FIG. 2 schematically illustrates a base station telephone set 3a that can be used for the system of FIG. 1. Referring to FIG. 2, the base station set 3a comprises a telephone receiver (handset) 11, a key input section 12 provided with push buttons for keying in numbers and signs and mode selection keys for operating a voice recorder of an automatic answering system 13, an automatic answering system 13 records the callers message when the recording mode is selected, a liquid crystal display section 14 for displaying the keys being pushed, the selected mode of operation of the voice recorder 13 or one of the functions of the telephone set currently selected by the user, and an antenna 15 for transmitting and receiving radio signals to/from the portable telephone set 3b.

Figure 3:
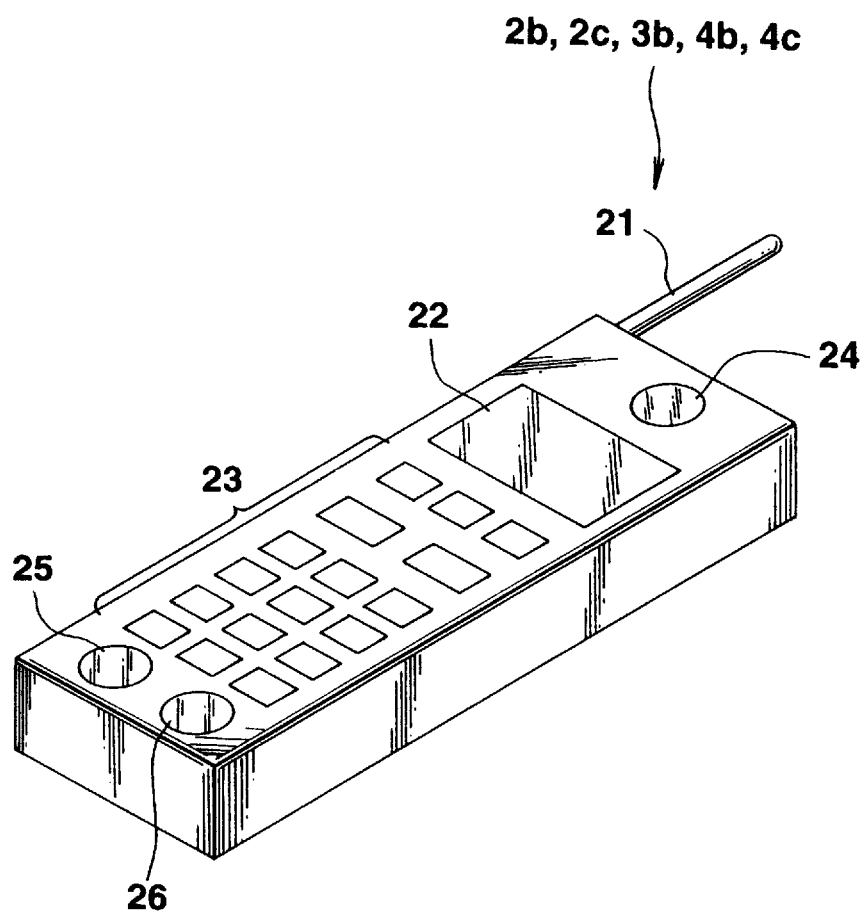
FIG. 3 is a schematic perspective view of a portable telephone set to be used in the cordless telephone system of FIG. 1.

FIG. 3 is a schematic perspective view of a portable telephone set 3b. Referring to FIG. 3, it comprises an antenna 21 for radio signal transmission and reception with the base station telephone set 3a or a public radio base station 2a or 4a, a liquid crystal display section 22 for displaying the keys being pushed or one of the functions of the telephone set currently selected by the user, a key input section 23 provided as shown in FIG. 4 with push buttons 23a for keying in numbers and signals and remote control buttons 23b for remotely operating the voice recorder of the base station telephone set including replaying, erasing and recording keys, a loud speaker 24 for reproducing the received voice, a microphone 25 for picking up the user's voice, and a loud speaker 26 for the ringer of the set.

Referring to FIG. 4, the push buttons 23a are used to key in the telephone number of the called party and/or the numerical data necessary to remotely control the base station set 3a, whereas the remote control buttons 23b are used to remotely control the voice recorder of the base station set 3a for recording, reproduction and erasure of speech.

Figure 5:
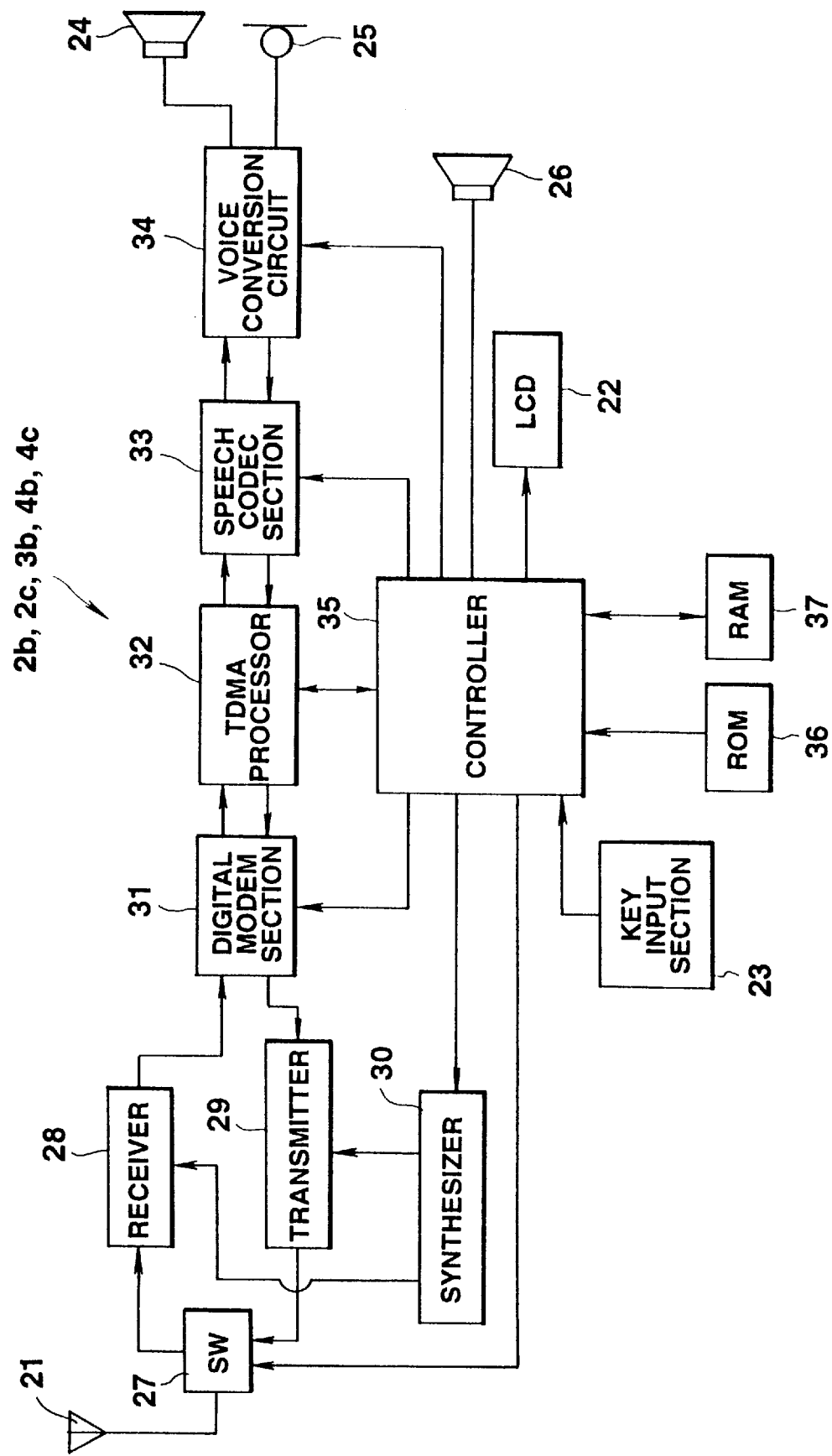
FIG. 5 is a block diagram of the portable telephone set of FIG. 3.

FIG. 5 illustrates a block diagram of the portable telephone set of FIG. 3. As shown in FIG. 5, it comprises an antenna 21, a liquid crystal display (LCD) 22, a key input section 23, a loud speaker 24, a microphone 25, a loud speaker for ringer 26, a switch 27, a receiver 28, a transmitter 29, a synthesizer 30, a digital modulator/demodulator (MODEM) section 31, a TDMA processor 32, a speech coder/decoder (CODEC) section 33, a voice conversion circuit section 34, a controller 35, a ROM 36 and a RAM 37. The antenna 21 is used for transmission and reception of signals in a predetermined frequency band including call signals and speech signals between the portable telephone set and the base station telephone set 3a located in the home 3 or a public radio base station 2a or 4a located in a public telephone booth 2 or a railway station 4. Signals received by the antenna 21 are then forwarded to the receiver 28 via the switch 27, whereas signals to be transmitted by the antenna 21 comes from the transmitter 29 via the switch 27. The switch (SW) 27 is controlled by the control section 35 for its switching operation to alternatively connect the antenna 21 to the receiver 28 or the transmitter 29. Normally, the antenna 21 is kept connected to the receiver 28 unless it is specifically connected to the transmitter 29 for signal transmission.

Upon receiving signals in a reception frequency band specified by the synthesizer 30 from the antenna 21 via the switch 27, the receiver 28 amplifies them with a given amplification factor and sends the amplified signals to the digital MODEM section 31. Upon receiving signals from the digital MODEM section 31 for transmission, on the other hand, the transmitter 29 transmits them out of the antenna 21 via the switch 27 in a transmission frequency band specified by the synthesizer 30.

As a particular oscillation frequency band is specified by the controller 35, the synthesizer 30 sets it up in the receiver 28 and the transmitter 29. The digital MODEM section 31 digitally demodulates digitally modulated signals received by the portable telephone set and coming from the receiver 28 and also digitally modulates signals for transmission coming from the TDMA processor 32 before sending them to the transmitter 29. The TDMA processor 32 exchanges speech signals with the digital MODEM section 31 and the speech CODEC section 33 for transmission and reception and telecommunications control signals with the control section 35 so that it may extract actual data from the digital data it receives in predetermined time slots and convert each set of digital data (voice data) generated in the portable telephone set into one having a given data format by adding to it a header it receives from the controller 35 before sending it out to the digital MODEM section 31 in predetermined time slots. The speech CODEC section 33 expands digital voice data it receives from the TDMA processor 32 that are compressed by a technique such as ADPCM and sends them out to the voice conversion circuit 34. It also compresses digital voice data coming from the voice conversion circuit 34 typically by ADPCM and sends them out to the TDMA processor 32. The voice conversion circuit 34 is equipped with an A/D converter and a D/A converter, and converts the digital speech data derived from the speech CODEC section 33 into an analog speech signal which will then be outputted to a speaker 24. The voice conversion circuit 34 also converts a speech signal inputted from a microphone 25 into a digital speech signal which will then be outputted to the speech CODEC section 33.

The controller 35 comprises a CPU (Central Processing Unit), a timer and other components, and executes a communication control process program of the portable telephone set stored in the ROM 36 for executing a communication control, controlling the operation of each and every component of the portable telephone set. It also controls the operation of displaying the telephone number input by the key input section 23 on the LCD 22 and the operation of the speaker 26 for the ringer of the portable telephone set and executes a determination process program stored in the ROM 36 for determining if the portable telephone set is located within the service area of a radio base station so that the result of the program execution may be displayed on the LCD 22.

As will be described hereinafter, the controller 35 also control the operation of transmitting the telephone number and a remote control signal depending on the results of the above execution of the program for determining if the portable telephone set is located within the service area of a radio base station.

The ROM (Read Only Memory) 36 stores the ID number of the portable telephone set, that of the base station telephone set, the communication control process program executed by the controller 35, and the determination process program for determining if the portable telephone set is located within the service area of a radio base station. The RAM (Random Access Memory) 37 is used as data areas for temporarily storing various data when the controller 35 executes the communication control process and the determination process used for determining if the portable telephone set is located within the service area of a radio base station. The RAM 37 also has memory areas for temporarily storing the telephone number of the base station telephone set, a # signal, the ID number for canceling the recording mode of the base station telephone set, a time to be set in the timer, information to be notified, and data necessary for remote control operation, and setting a timer flag, a flag of a private reception area, a flag of a public service area and a flag of out-of public service area. The LCD 22 displays various data provided by the controller 35 as well as the result of the determination process of determining if the portable telephone set is in or out of the service area of the base station telephone set or the public radio base station. The ringer 26 is driven by a ringer signal which is output by means of the communication process executes by the controller 35 to generate a ringer sound whenever the portable telephone set is called.

Operations of the first embodiment having the above described configuration will be described below.

First, slots (channels) to be used by the portable telephone set to communicate with the private radio base station (base station telephone set 3a) and the public radio base station will be described with reference to FIG. 6.

Figure 6:
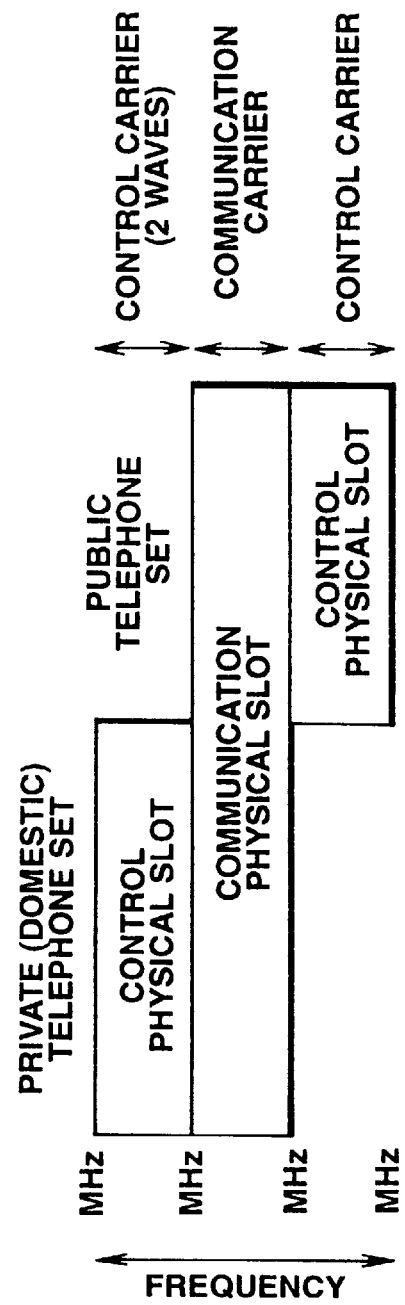
FIG. 6 is a schematic illustration of the configuration of the control and telecommunications physical slots of a second generation cordless telephone system.

Referring to FIG. 6, two different types of slots are used for radio communication by the portable telephone set. One is the control physical slot (control channel) and the other is communication physical slot (communication channel). The control channel is divided into a private (home) control channel and a public control channel. Note that a portable telephone set can establish communication channels with a public radio base station and with the private radio base station, and respective base radio stations have predetermined respective service areas for establishing communication channels therein. That is, if the portable telephone set is out of the service area of the public radio base station (if it can no longer receive control signals from the public radio base station through the established public control channel), a message "OUT-OF PUBLIC SERVICE AREA" is displayed on the LCD 22 to inform the user that he or she cannot call or be called via the public radio base station. On the other hand, if it enters the service area of the public radio base station, a message "PUBLIC SERVICE AREA" is displayed on the LCD 22 to inform the user that he or she now can call or be called via the public radio base station.

If the portable telephone set enters the service area of the private radio base station (if it can now receive control signals from the private radio base station through the established private control channel), message "PRIVATE RECEPTION AREA" is displayed on the LCD 22 to inform the user that he or she can exchange information through the private radio base station.

Now the process of determining if the portable telephone set is located within the service area of the base station telephone set (in the home), that of the public radio base station (except for that of the base station telephone set) and the out-of service area of the public radio base station will be described by referring to the flow chart of FIG. 7.

Figure 7:
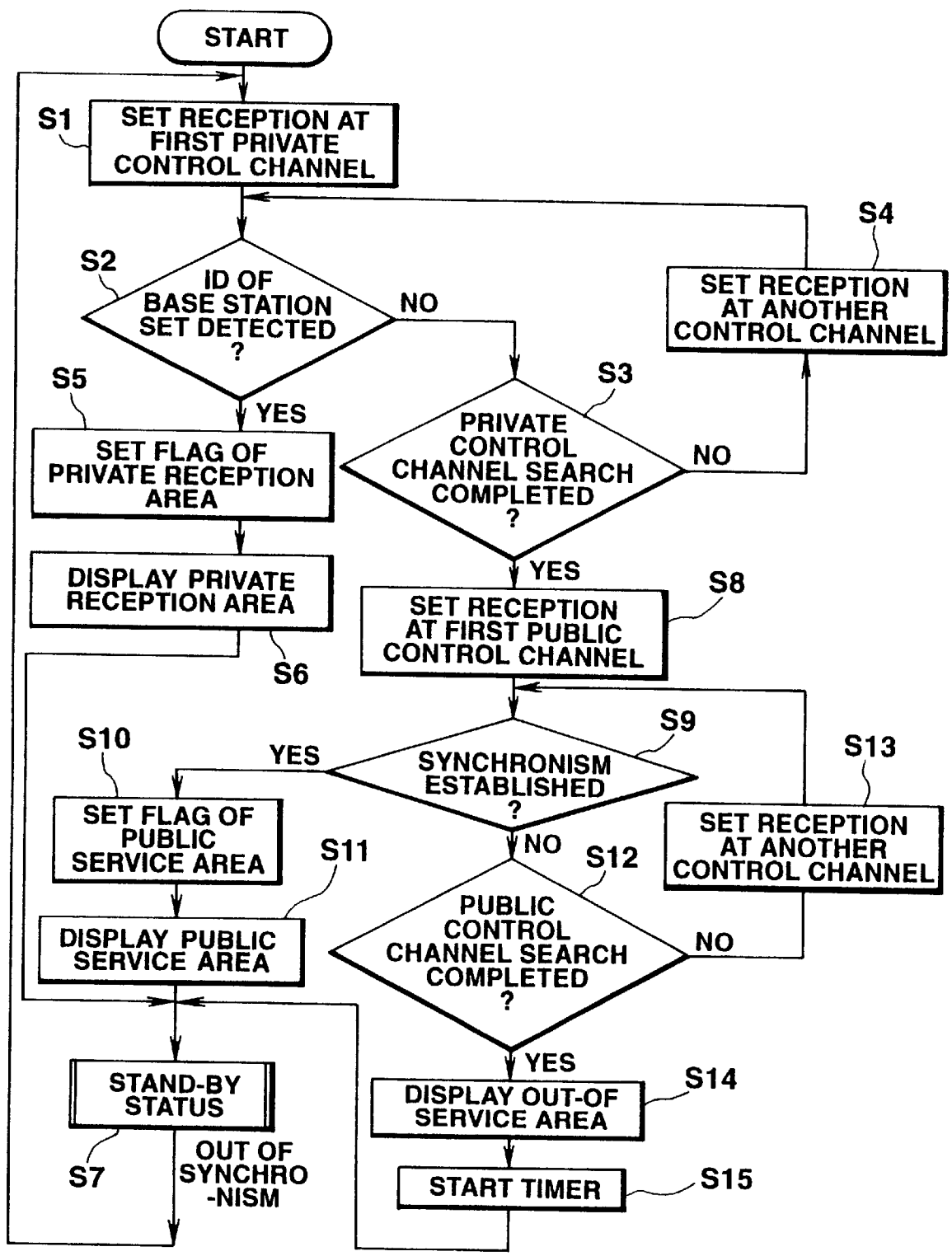
FIG. 7 is a flowchart of the operation for determining if the portable telephone set of FIG. 5 is located within the service area of the base station telephone set, that of the public radio base station or out of the public radio base station.

Referring to FIG. 7, a first private control channel is made ready for signal reception (step S1) and then it is determined if the ID number of the base station telephone set being transmitted by radio from the base station set can be detected through the control channel (step S2). If the ID number of the base station set is not detected through the currently activated control channel and if all the private control channels have not been completely scanned (step S3), the reception frequency of another private control channel is set in order to make the another private control channel ready for signal reception (step S4). The process returns to step S2 to once again find out if the ID number of the base station set is detected through the currently activated control channel.

If, on the other hand, the ID number of the base station set is detected in step S2, a flag of private reception area is set up (step S5) and a private reception area message is displayed on the LCD 22 (step S6) so that the process moves to a stand-by status and monitors any out-of synchronism (step S7). If an out-of synchronism is found, the process goes back to step S1.

Meanwhile, if the ID number of the base station set has not been detected even when the operation of scanning all the private control channels is over in step S3, the controller 35 sets up a first public control channel (step S8) and determines if a synchronism is established or not (step S9). If yes, a flag of public service area is set up (step S10) and a public service area message is displayed on the LCD 22 (step S11). The process moves to a stand-by status and monitors any out-of synchronism (step S7). If an out-of synchronism is found, the process 35 goes back to step S1.

If, on the other hand, no synchronism is established in step S9, it is determined if all the reception frequencies have been scanned for the public control channel (step S12). If not, reception frequencies are set up at another control channel and the process returns to the process of determining if a synchronism is established or not (step S13). If all the reception frequencies have been scanned for the public control channel, an out-of public service area message is displayed on the LCD 22 (step S14) and the timer is started (step S15) before the process returns to a stand-by status (step S7).

Figure 8:
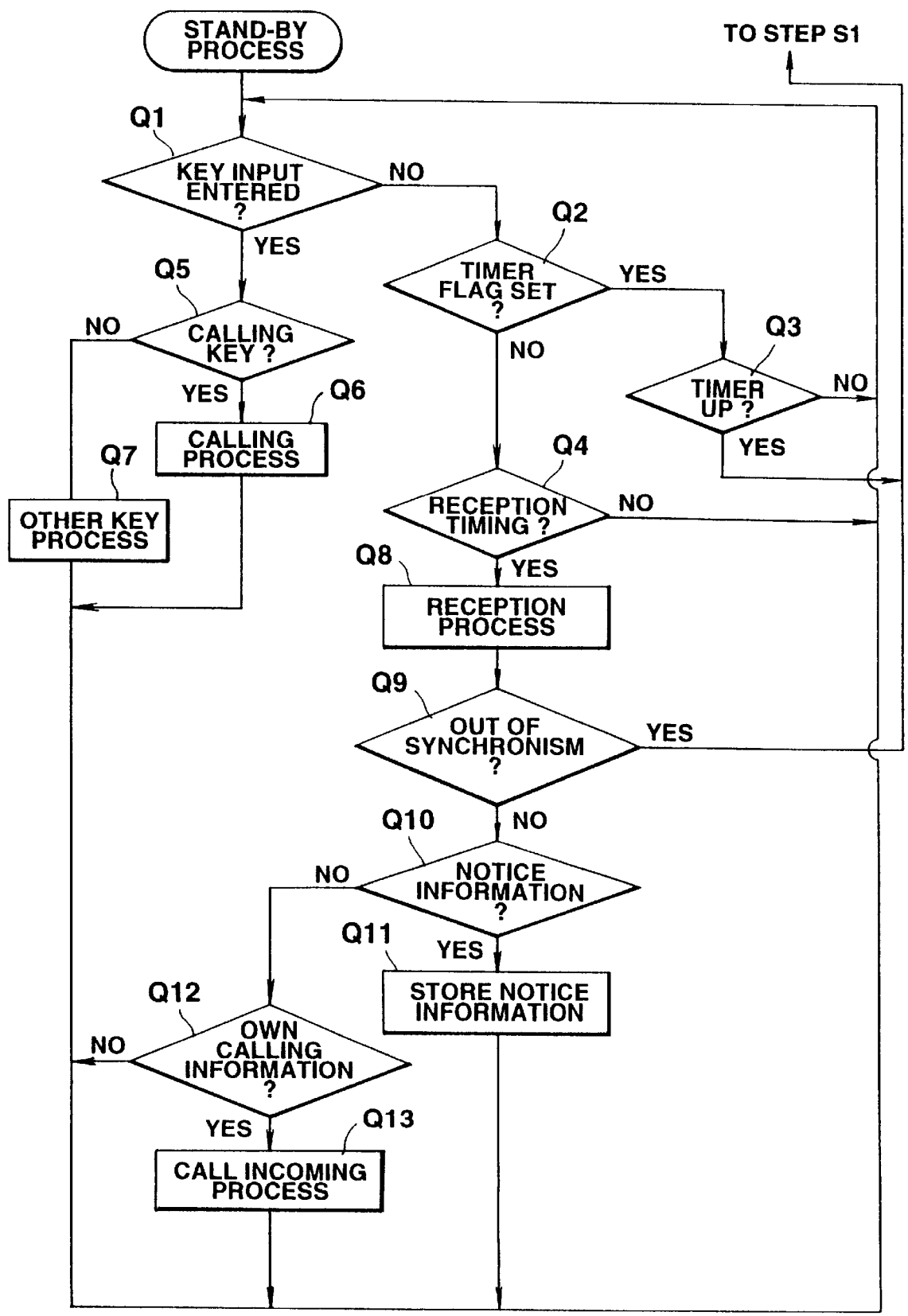
FIG. 8 is a flowchart of the operation for processing a stand-by process to be carried out in step S7 of FIG. 7.

Now, the operation of the controller 35 in a stand-by status in step S7 will be described by referring to the flowchart of FIG. 8.

After completing the display of an out-of public service area message in step S11 and a private reception area message in step S6 and the start of the timer in step S15, the process moves to a stand-by status. First it is determined if the key input section 23 is operated by the user (step Q1) and, if it is not operated, it is determined if a timer flag which is set up by the timer start operation in step S15 is set or not (step Q2). If the timer flag is set, it is determined if a time up exists or not (step Q3). If the time up exists, the process returns to the above described process of setting up the reception at the first private control channel in step S1. If the time up does not exist, the processes in steps Q1 to Q3 are repeatedly executed until the time is up or the key operation is executed.

If, on the other hand, it is determined in step Q2 that no timer flag is set up for a public service area or private reception area, it is determined if it is the timing signal for intermittent reception (step Q4). If it is determined that it is not the timing signal for intermittent reception, the process returns to step Q1. Steps Q1, Q2 and Q4 are repeatedly executed until the key input section 23 is operated by the user or the timing signal comes for intermittent reception.

If the key input section 23 is operated by the user in step Q1, it is determined if the operated key is the calling key or not (step Q5). If yes, a calling process is carried out and then the process returns to step Q1 (step Q6). If the operated key is not the calling key but some other key, a process designated by the depressed key is carried out and the process returns to step Q1 (step Q7).

If, on the other hand, it is determined in step Q4 that it is now the reception timing, the reception process is carried out (step Q8) and then it is determined if an out-of synchronism exists or not (step Q9). If it is determined that an out-of synchronism exists, the process returns to step S1 for setting up a reception at a first private control channel. If, on the other hand, it is determined that no out-of synchronism exists, it is determined if notice information (those concerning the reception timing etc.) are received or not (step Q10). If notice information are received, they are stored (step Q11) and the process returns to step Q1. If no notice information are received, it is determined if own calling information is received or not (step Q12). If own calling information is received, a call incoming process is carried out (step Q13) and the process goes back to step Q1. If no own calling information is received, the process directly goes back to step Q1.

Now, the calling process to be carried out in step Q6 will be described below in detail. When the calling key of the key input section 23 of the portable telephone set is operated, a communication channel assignment request signal is transmitted to the related radio base station by way of the control channel. When a channel is assigned to it by the radio base station, a call request signal is transmitted through the assigned communication channel. Thereafter, as the push button keys are operated, the data representing the operated keys are sent to the radio base station. Then, a communication line is established by the above calling process between the calling portable telephone set and the called telephone set so that the calling party may communicate with the called party through the microphone 25 and the speaker 24.

The call incoming process to be carried out in step Q13 for receiving a call will be described below in detail. If the portable telephone set is called by means of own calling information transmitted as the radio signal from the related radio base station, that is, if the received ID number agrees with the ID number stored in advance in the ROM 36, the speaker 26 for ringer emits a ringing sound to inform the called party of the incoming call. If the called party then operates the communication key in response to the incoming call, a communication channel assignment request signal is transmitted to the radio base station. As a communication channel is assigned by the radio base station, an acknowledge signal is transmitted to the radio base station via the assigned communication channel. When the above described call incoming process is over, a communication line is secured between the calling telephone set and the called portable telephone set so that the called party may speak with the calling party through the microphone 25 and the speaker 24.

Now, another process of determining if the portable telephone set is within the private reception area of the base station telephone set or within or out-of the service area of the public radio base station will be described by referring to the flow chart of FIG. 9.

Figure 9:
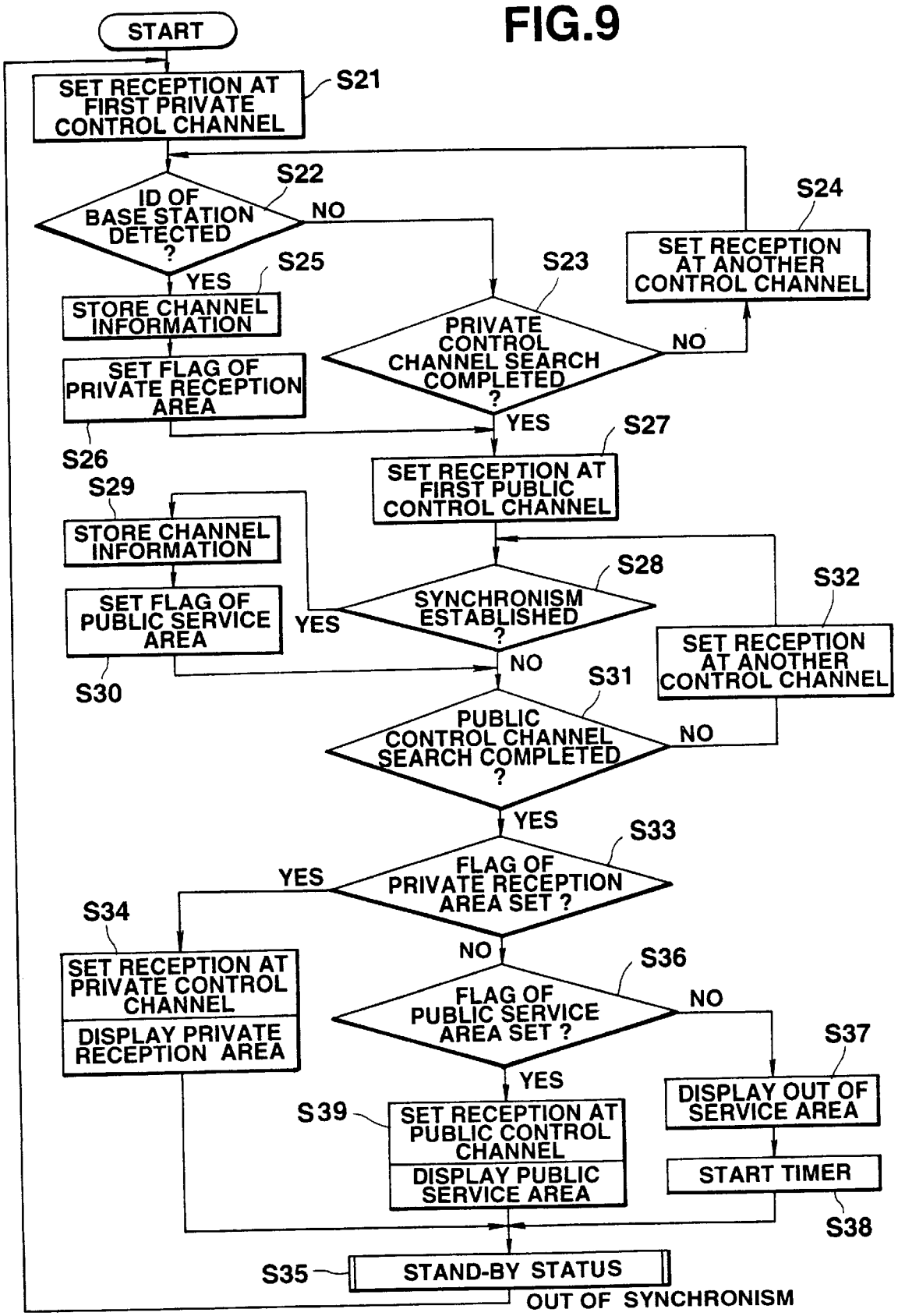
FIG. 9 is a flowchart of an alternative operation that can be used for determining if the portable telephone set of FIG. 5 is located within the service area of the base station telephone set, that of the public radio base station or out of the public radio base station.

Referring to FIG. 9, first the reception frequency at the first private control channel is set up (step S21). It is determined if the ID number of the base station telephone set transmitted from the latter by radio is detected in the private control channel or not (step S22). Unless the ID number of the base station telephone set is detected in the control channel which is currently used and unless the operation of scanning all the private control channels is completed (step S23), the reception frequency is set up at another private control channel (step S24). The process returns to the process in step S22 to determine if the ID number of the base station telephone set is detected in the private control channel or not.

If, on the other hand, the ID number of the base station telephone set is detected in step S22, the name of the control channel is stored in the RAM 37 (step S25). After a flag of private reception area is set (step S26) or after the operation of scanning all the private control channels is over in step S23, the reception frequency is set up at the first public control channel (step S27). Subsequently, it is determined if a synchronism is established for the first public control channel or not (step S28). If yes, the name of the control channel where synchronism is established is stored in the RAM 37 (step S29) and a flag of a public service area is set up (step S30).

If, on the other hand, no synchronism is established in step S28, or a flag of public service area is set up in step S30, it is determined if the operation of scanning all the public control channels is completed or not (step S31). If no, the reception frequency is set up at another public control channel and the process then returns to the determination process in step S28 to determine if a synchronism is established or not (step S32). If the operation of scanning all the public control channels is completed, it is checked if a flag of private reception area is set up or not (step S33). If yes, the reception frequency is set up at the private control channel which is stored in step S25 and a private reception area message is displayed on the LCD 22 (step S34).

Next, the process proceeds to stand-by status (step S35) and, when out-of synchronism is detected, the process returns to step S21. On the other hand, unless the flag of private reception area is set in step S33, it is checked whether the flag of the public service area is set up or not (step S36). If so, the reception frequency is set up at the public control channel which is stored in step S29 and a public service area message is displayed on the LCD 22 (step S39). If the flag of the public service area is not set, the LCD 22 displays an out-of public service area (step S37) and the timer is started (step S38). After the process moves into a stand-by status and waits for the time period set in the timer (step S35), the process returns to step S21.

Figure 10:
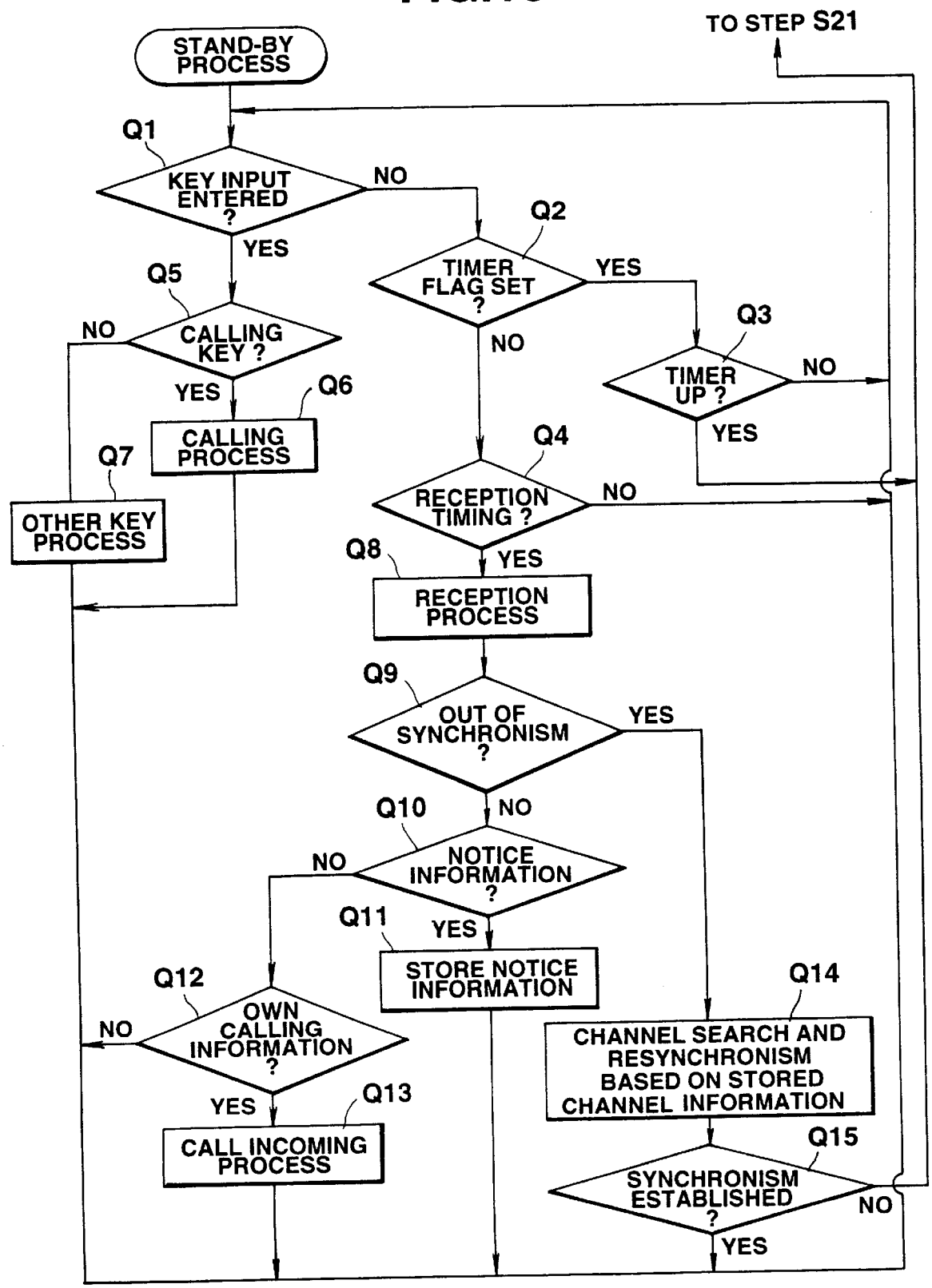
FIG. 10 is a flowchart of the operation for processing a stand-by process to be carried out in step S35 of FIG. 9.

Referring to the flowchart of FIG. 10, a stand-by process status in step S35 will be described. The steps of FIG. 10 that are same as those of the corresponding steps of FIG. 8 are respectively indicated by the same symbols and will not be described here any further.

If an out-of synchronism is detected in step Q9, all the channels are searched again to reestablish a synchronism (step Q14) since the names of those channels available for signal reception are stored in the RAM 37 before the out-of synchronism starts. Then, it is determined if a synchronism is established in any of the channels which are stored in the RAM 37 (step Q15) and, if yes, the process returns to step Q1.

If the resynchronized channel is shifted from the one in the private reception area to the one in the public service area or vice versa, the flag and the message on the display will be appropriately changed correspondingly.

If, on the other hand, a synchronism is not reestablished, the process goes back to step S21 in FIG. 9 to set the reception at the first private control channel.

It should be noted that the controller 35, the ROM 36 and the RAM 37 need to be modified by, for example, adding a storage area for storing channel information to the RAM 37 in order to make the configuration of FIG. 5 adapted to the above operation of going back to step 21.

Referring to the flowchart of FIG. 11, the process executed by the portable telephone set when any of the remote control buttons 23b in FIG. 4 is depressed will be described.

Figure 11:
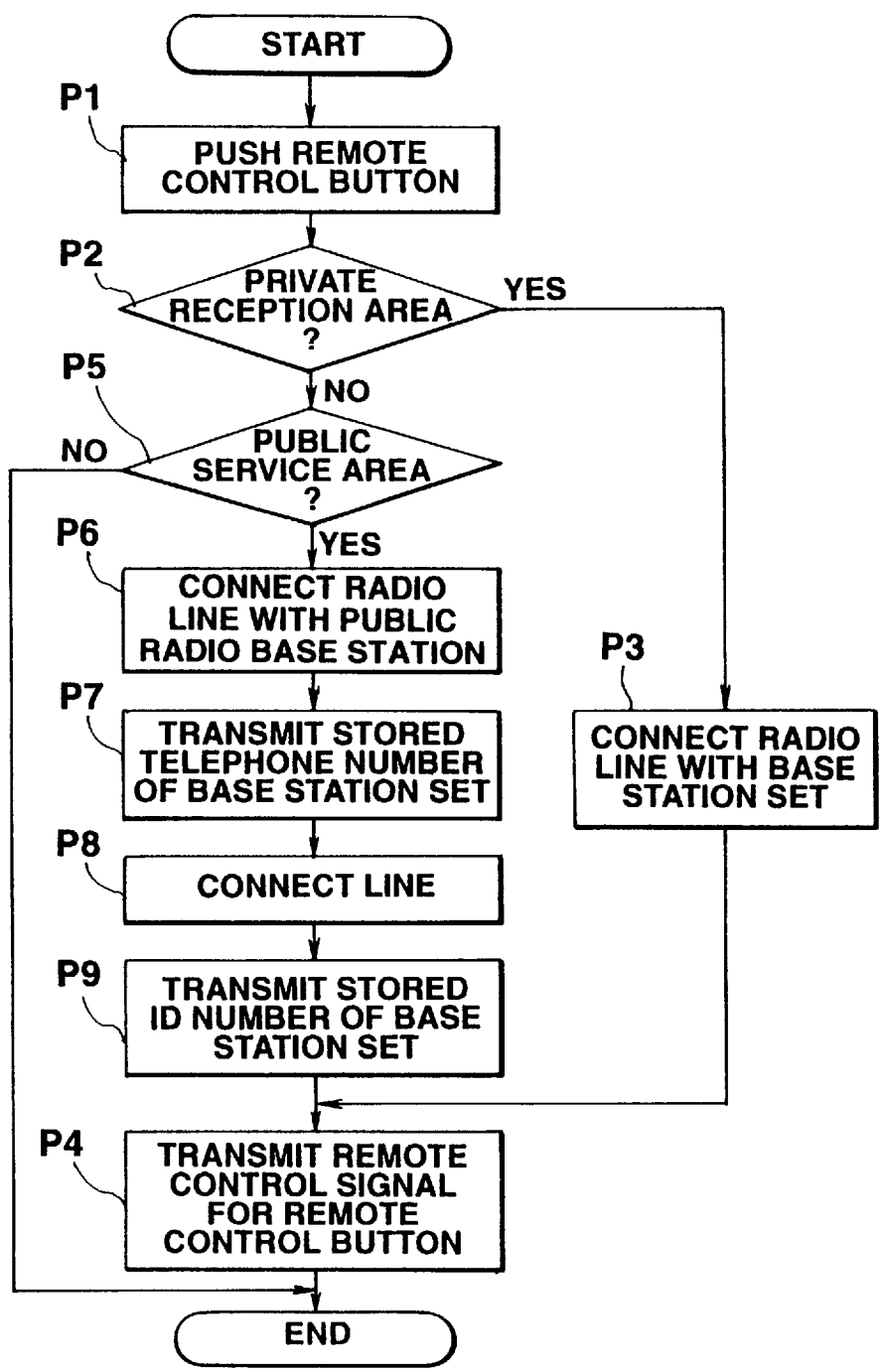
FIG. 11 a flowchart of the basic operation of the portable telephone set of FIG. 5 when the key input section of FIG. 4 is used to remotely control the base station telephone set.

Referring to FIG. 11, if any of the remote control buttons 23b is depressed by the user (step P1), it is determined where the portable telephone set is located as the result of the above described process of determining if the portable telephone set is within the private reception area or within or out-of the public service area (step P2, P5). If a private reception area message is displayed on the LCD 22, a radio line is connected between the portable telephone set and the base station telephone set (step P3) and a remote control signal corresponding to the depressed remote control button is transmitted to the base station telephone set to terminate the process (step P4).

If, on the other hand, a public service area message is displayed on the LCD 22 as a result of the determination process, the public radio line is connected to the portable telephone set (step P6) and the telephone number of the base station telephone set stored in the RAM 37 is transmitted (step P7). Once the portable telephone set is connected to the public radio base station by way of a radio line (step P8), # signal stored in the RAM 37 is transmitted to suspend the transmission of an acknowledge message by the base station telephone set. Then, the ID number for canceling the recording mode of the base station telephone set 3a stored in the RAM 37 is transmitted (step P9) and a signal corresponding to the depressed remote control button is transmitted to the base station telephone set to terminate the process (step P4).

If it is determined in step P5 that the portable telephone set is located out of the public service area, the process in FIG. 11 is immediately terminated.

FIG. 12A shows the message to be transmitted from the portable telephone set of the first embodiment when any of the remote control buttons 23b of the key input section 23 is depressed by the user and a public service area message is displayed on the LCD 22, whereas FIG. 12B shows the message to be transmitted from the portable telephone set of the first embodiment while a private reception area message is displayed on the LCD 22.

When any of the remote control buttons 23b of the portable telephone set of the first embodiment is depressed, the telephone number, the # signal, the ID number and the control information (remote control signal) stored in the RAM 37, as shown in FIG. 12A, are sequentially transmitted in the public service area, whereas only the control information shown in FIG. 12B is transmitted in the private reception area.

Therefore, when the user of the portable telephone set controls remotely the base station telephone set in the public service area, the user can automatically transmit the telephone number, the # signal, and the ID number, which are required to control remotely the base station set in the public service area, by conducting the same operation of the remote control buttons 23b as those conducted in the private reception area. As a result, the same procedures of the remote control operation can be used in both the private reception area and the public service area and thus the procedures of the remote control operation of the portable telephone set can be simplified and the remote operation can be improved.

While the process of determining if the portable telephone set 3b is within the private reception service area or within or out-of the public service area is carried out before any of the remote control buttons is depressed in the above first embodiment, the process may alternatively be carried out after any of the remote control buttons is depressed.

While separate remote control buttons 23b are provided in the key input section 23 of the portable telephone set of FIG. 4, some of the numbered push buttons may alternatively be used for remotely controlling the base station telephone set. If such is the case, the extension mode selection button may be depressed to select the extension mode and thereafter the # button may be used as a switch for selecting any of the remote control buttons and, a specific one of the remote control buttons may be depressed after the # button to remotely control the operation of the base station telephone set.

In short, with the portable telephone set of the above described first embodiment, the base station telephone set can be remotely controlled only by transmitting from the portable telephone set a signal for selecting a specific operation of the base station telephone set that varies depending on whether the portable telephone set is in a private reception area or in a public service area.

The above operation of remotely controlling the base station telephone set may alternatively be so modified that, if the portable telephone set is within the public service area, the network mode selection button may be depressed before the extension mode selection button in order to use different procedures for remotely controlling the base station telephone set in a public service area and in a private reception area. If such is the case, the only difference between the two procedures lies in which of the extension mode selection button and the network mode selection button is depressed first and the operation of remotely controlling the base station telephone set remains as simple as ever.

(Second Embodiment)

FIGS. 13 through 21 illustrate a second embodiment of a portable telephone set according to the present invention that can suitably be used for a second generation cordless telephone system.

Figure 13:
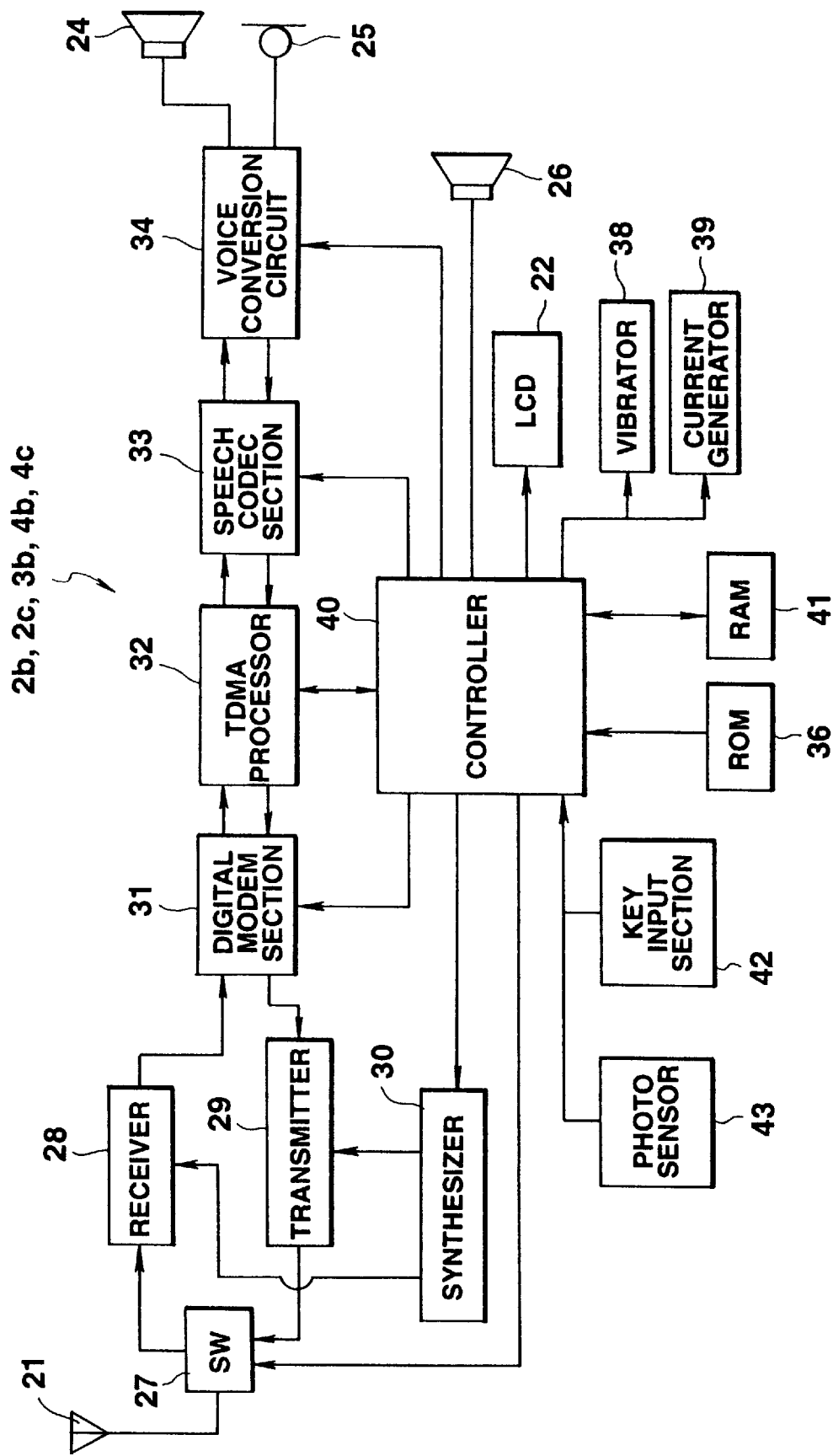
FIG. 13 is a block diagram of a second embodiment of portable telecommunications apparatus to be used as a portable telephone set for a second generation cordless telecommunications system.

FIG. 13 is a schematic block diagram of the embodiment similar to the one shown in FIG. 4. Those components that are same as the corresponding ones of the embodiment of FIG. 4 are respectively denoted by the same reference numerals and their descriptions are omitted here. Referring to FIG. 13, portable telephone set of the second embodiment comprises an antenna 21, an LCD 22, a key input section 42, a speaker 24, a microphone 25, a speaker 26 for ringer, a switch 27, a receiver 28, a transmitter 29, a synthesizer 30, a digital MODEM section 31, a TDMA processor 32, a speech CODEC section 33, a voice conversion circuit section 34, a ROM 36, a RAM 41, a vibrator 38, a current generator 39, a controller 40 and a photo sensor 43. The controller 40 comprises a CPU (Central Processing Unit), a timer and other components and executes a program stored in the ROM 36 for controlling the operation of each and every component of the portable telephone set and processing data. It also controls the operation of displaying the telephone number input by the key input section 23 on the LCD 22 and the operation of the speaker 26 for the ringer of the telephone set and executes a program stored in the ROM 36 for determining if the portable telephone set is located within the service area of a radio base station so that the result of the program execution may be notified by causing the speaker 26 for ringer to sound. The means for notifying the result of the determining operation may be switched from the speaker 26 for ringer to the vibrator 38 or the current generator 39 by operating a switch of the key input section 23. The RAM 41 has memory areas for temporarily storing a time to be set in the timer, notice information, telephone number, and setting a timer flag, a flag of a private reception area, a flag of a public network service area and a flag of an out-of public service area. The key input section 42 comprises numerical keys, the switch for switching the notifying means as described above, a notification mode switch, which will be described hereinafter. The photo sensor 43 is provided to carry out an automatic dialing function whenever it detects light, which will be described hereinafter.

Now, the basic operation of the second embodiment of the portable telephone set will be described by referring to the flowchart of FIG. 14.

Figure 14:
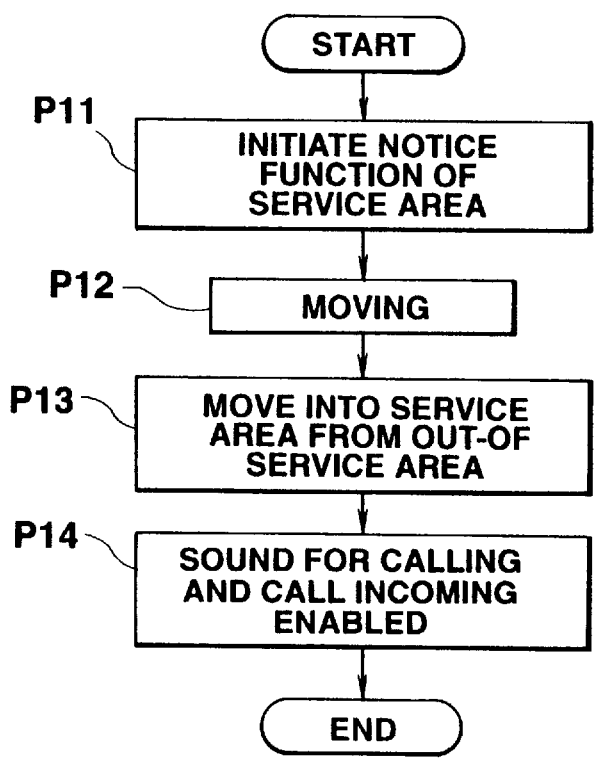
FIG. 14 is a flowchart for the principal operation of the portable telephone set of FIG. 13.

As shown in FIG. 14, the service area notice function of the second embodiment is activated (step P11) when the power switch or the notification mode switch in the key input section 42 is depressed by the user. Thereafter, if the user moves with the portable telephone set (step P12) and goes into the service area of the public or private radio base station (step P13), the portable telephone set sounds to notify the user that it is ready for calling and being called (step P14).

Then, if the power switch of the portable telephone set is turned on under this condition, the control section 40 determines if it is in a public service area or in a private reception area and notifies the user of the result of the determining operation with a sound. The operation of the control section 40 for determining if the portable telephone set is in a public service area or in a private reception area and notifying the user of the result of the determining operation with a sound will be described by referring to the flowchart of FIG. 15.

Figure 15:
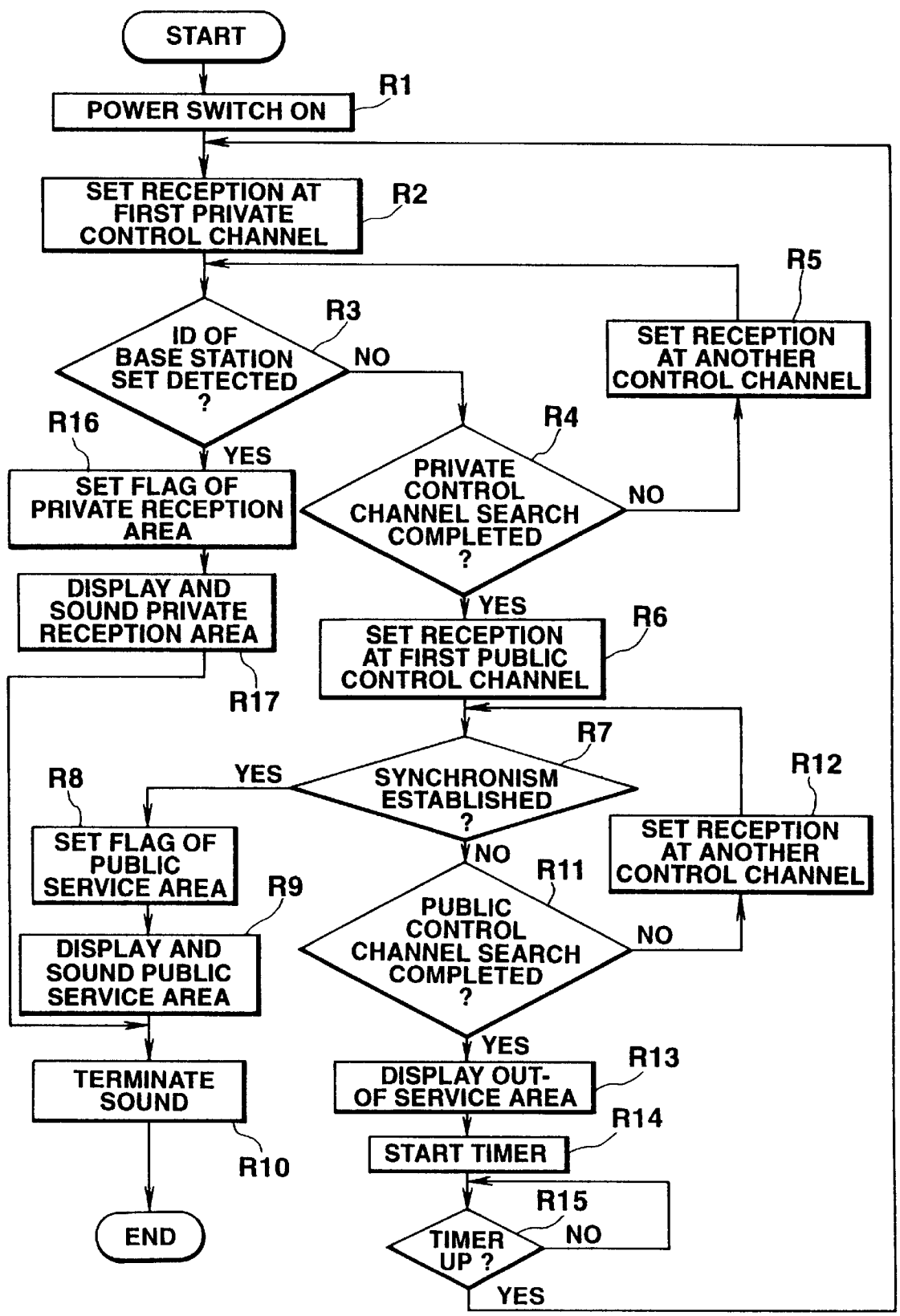

In FIG. 15, as the power switch of the portable telephone set is turned on (step R1), the synthesizer 30 is set up at a frequency that corresponds to the frequency of the first private control channel and a reception process is started (step R2). It determines if the ID number of the base station telephone set is detected in that channel or not (step R3). If the ID number of the base station set is not detected, it is checked if the operation of scanning the frequencies of all the private control channels is completed or not (step R4). If it is found that the operation is not completed, the frequency band of a private control channel that has not been scanned is set up (step R5) and the process returns to the operation of determining if the ID number of the base station set is detected or not in that channel.

On the other hand, if it is found in step R4 that the operation of scanning the frequencies of all the private control channels is completed and the ID number of the base station set is not detected, the synthesizer 30 is set at a frequency that corresponds to the frequency of the first public control channel and a reception process is started (step R6). It is determined if a synchronism is established in the first control channel for signal reception or not (step R7). If yes, a flag of public service area is set up (step R8) and a public service area message is displayed on the LCD 22, while causing the speaker 26 for ringer to notify the user of the fact that the portable telephone is set within the public service area with sound (step R9). After notifying the user of the fact with sound for a given period of time, the sound and the process is completed (step R10).

If, on the other hand, a synchronism is not established at the first control channel in step R7, it is determined if the operation of scanning the frequencies of all the public control channels is completed in step R11. If not, the frequency is set at another public control channel, the process returns to step R7 to determine if a synchronism state is established or not (step R12). If it is determined that the operation of scanning the frequencies of all the public control channels is completed, an out-of public service area message is on the LCD (step R13) and the timer is started (step R14). The process waits until the time period set in the timer passes (step R15) and then returns to step R2, where the synthesizer 30 is set at a frequency corresponding to that of the first private control channel.

If the ID number of the base station telephone set is detected in step R3, a flag of private reception area is set up (step R16) and a private reception area message is displayed while causing the speaker 26 for ringer to emit a ringing sound to notify the user of the fact that he or she is in the private reception area (step R17). Then the speaker 26 is caused to stop sounding after a given period of time and the entire process is terminated (step R10).

When the notification mode switch arranged in the key input section 42 is turned on while the power switch is on, a sounding operation depending on the result of the process carried out by the control section 40 to determine if the portable telephone service set is in or out of the service area will be described with reference to the flowchart of FIG. 16. Note that the control section 40 carries out an operation of determining if the telephone set is in or out of the service area as illustrated in FIG. 7 or 9.

Figure 16:
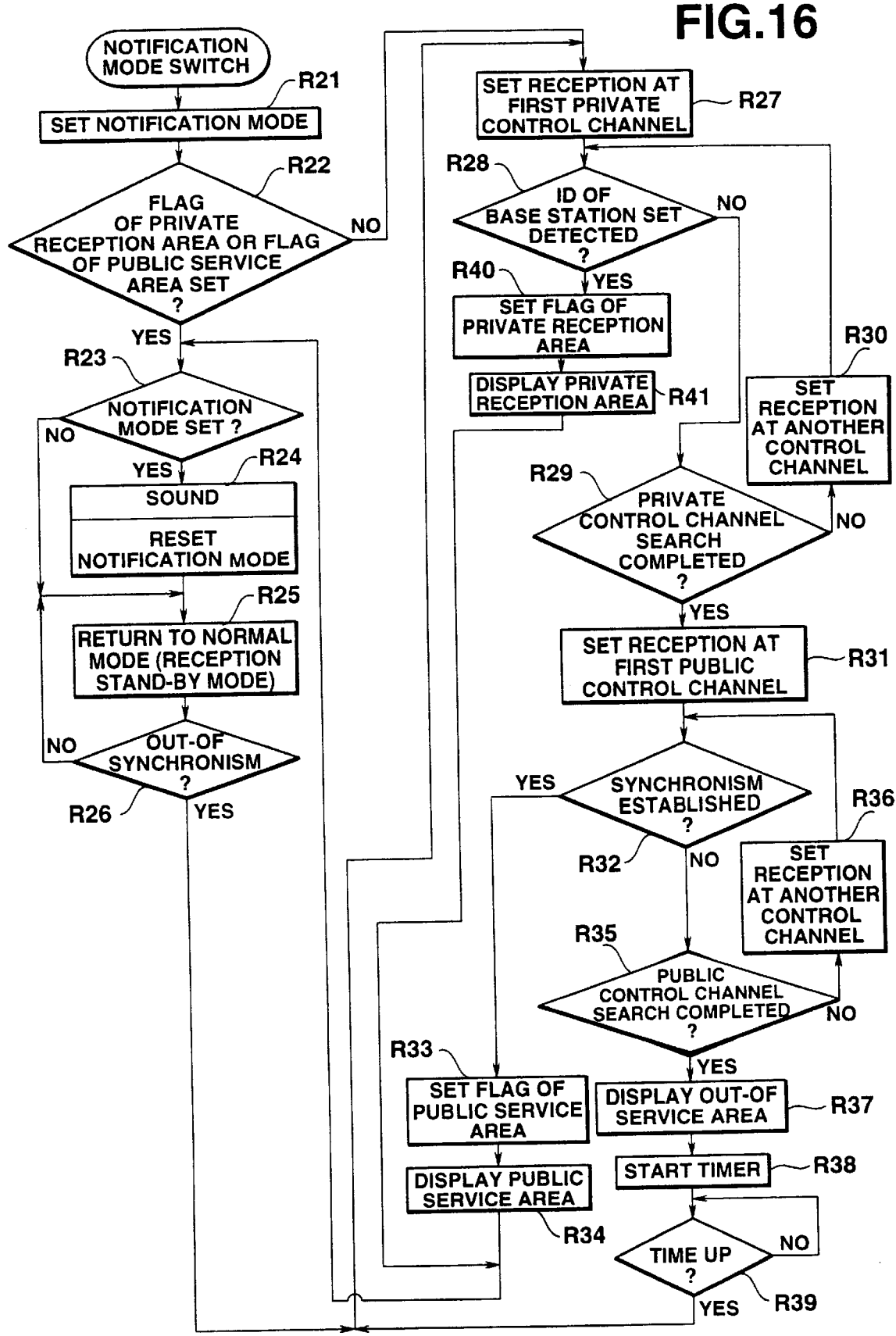

Referring to FIG. 16, if the notification mode switch arranged in the key input section 42 is depressed by the user, the portable telephone set moves into the notification mode (step R21). It is checked if a flag of a private reception area or a flag of a public service area is set up (step R22). If yes, it is checked if the notification mode is set or not (step R23). If yes, the speaker 26 for ringer is caused to sound to notify the user that he or she is in the private reception area or public service area and resets the notification mode (step R24) before the process returns to the normal mode (reception stand by mode) (step R25). If not, the process directly returns to the normal mode (step R25).

Thereafter, it is determined if an out-of synchronism exists or not (step R26). If yes, the synthesizer 30 is set at a frequency corresponding to the reception frequency of the first private control channel and a reception process is started (step R27) in order to determine if the ID number of the base station telephone set is detected or not (step R28). If it is determined that the ID number of the base station telephone set is not detected, it is checked if the operation of scanning the frequencies of all the private control channels is completed (step R29). If not, the frequency is set at another private control channel (step R30) and the process returns to step R28 to detect the ID number of the base station set.

If, on the other hand, it is determined in step R29 that the operation of scanning the frequencies of all the private control channels is completed and the ID number of the base station set is not detected, the synthesizer 30 is set at a frequency corresponding to the reception frequency of the first public control channel and receiving incoming signals is started (step R31). It is determined if a synchronism is established at the first control channel (step R32). If yes, a flag of a public service area (step R33) is set up and a public service area message is displayed on the LCD (step R34) before the process returns to step R23 for the process of determining if the notification mode is set or not.

If, to the contrary, it is found that a synchronized state is not established in the first control channel in step R32, it is determined in step R35 if the operation of scanning the frequencies of all the public control channels is completed and, if not, the reception frequency is set at another control channel and the process returns to step R32 to determine if a synchronism is established or not (step R36). If it is found that the operation of scanning the frequencies of all the public control channels is completed, an out-of public service area message is displayed on the LCD 22 (step R37) and, at the same time, the timer is started (step R38). The process waits until the time period set in the timer passes (step R39) and then returns to step R27, where the synthesizer 30 is set at a frequency corresponding to that of the first private control channel.

If the reception of the ID number of the base station set is detected in step R28, a flag of a private reception area is set up (step R40) and a private reception area message is displayed on the LCD 22 (step R41) before the process returns to step R23, where it is checked if the notification mode is set or not.

The process for causing the speaker 26 for ringer to sound whenever the portable telephone set moves from out of the public service area into the public service area if the notification mode switch in the key input section 42 is on, will be described below by referring to the flowchart of FIG. 17.

Figure 17:
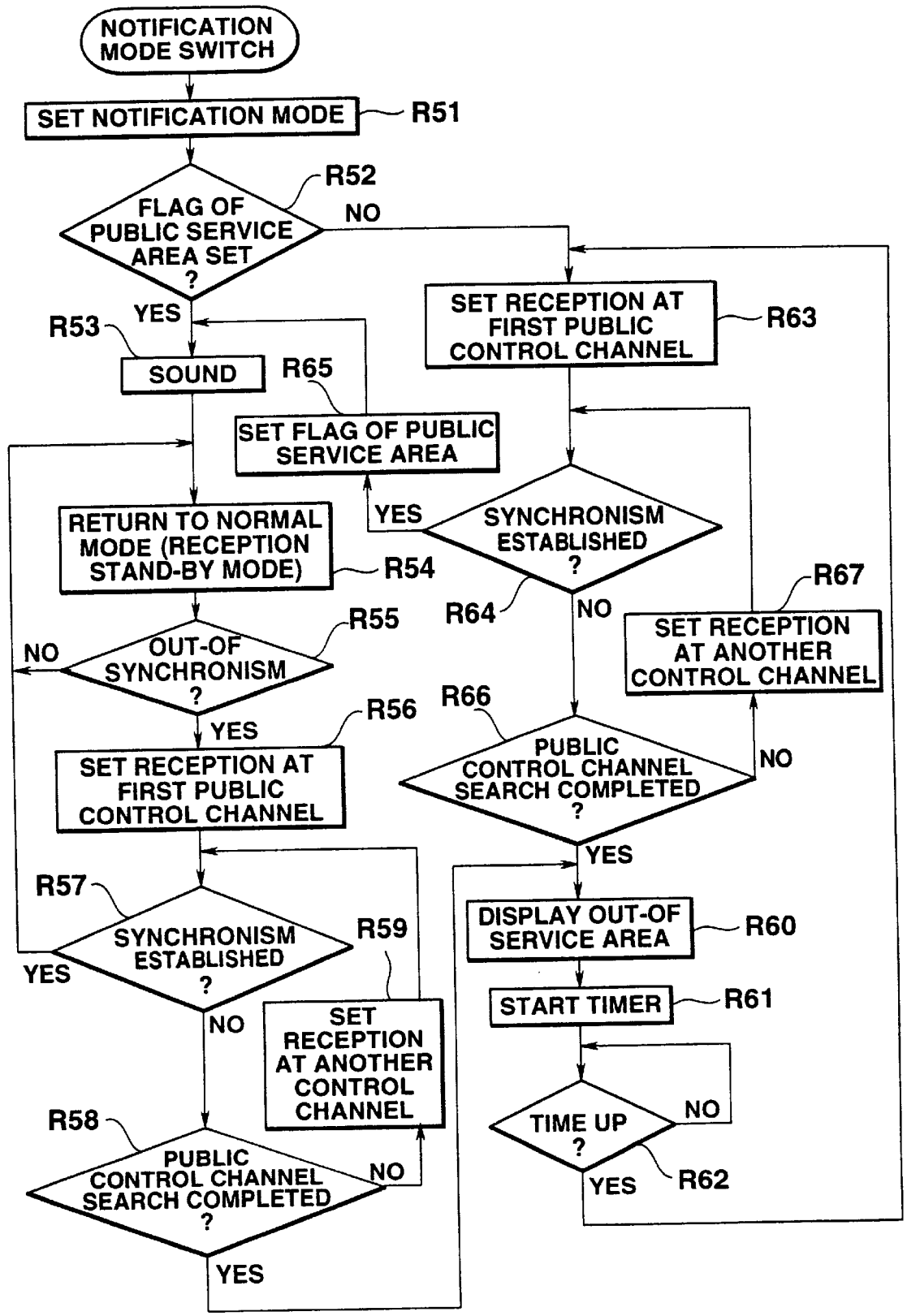

Referring to FIG. 17, when the notification mode switch in the key input section 42 is turned on by the user, the notification mode is set in the portable telephone set (step R51) and it is checked if a flag of a public service area is set up (step R52). If yes, the speaker 26 for ringer is caused to emit a notification sound (step R53). The process then returns to the normal mode (reception stand-by mode) for signal to check if an out-of synchronism exists or not (steps R54 and R55). If an out-of synchronism is detected, the synthesizer 30 is set at a frequency that corresponds to the frequency of the first public control channel to start receiving signals (step R56). It is determined if a synchronism for reception at the first control channel is established (step R57). If yes, the process returns to the normal mode in step 54 (reception stand-by mode) but, if not, it is determined in step R58 if the operation of scanning the frequencies of all the public control channels is completed or not. If the scanning is not completed the reception frequency is set at another control channel. The process returns to the operation of step R57 to determine if a synchronism is established or not (step R59). If, on the other hand, the scanning is completed an out-of public service area message is displayed on the LCD 22 (step R60) and the timer is started (step R61). The process waits until the time period set in the timer elapses (step R62). Then the synthesizer 30 is set at a frequency corresponding to the reception frequency at the first public control channel to start the operation of signal reception (step R63).

Subsequently, it is determined if a synchronism for reception is established at the first control channel or not (step R64). If yes, a flag of a public service area is set up (step R65) and the speaker 26 for ringer is caused to sound. If, on the other hand, if it is found that a synchronism is not established at the first control channel, it is determined in step R66 if the operation of scanning the frequencies of all the public control channels is completed. If not, the reception frequency is set at another control channel before the process returns to the determination process in step R64, where it is determined if a synchronism is established at another control channel or not (step R67). If the operation of scanning the frequencies of all the public control channels is over, an out-of public service area message is displayed on the LCD 22 (step R60) and the timer is started (step R61). The process waits until the time period set in the timer passes (step R62) and then returns to step R63, where the synthesizer 30 is set at a frequency corresponding to the reception frequency at the first public control channel.

Figure 18:
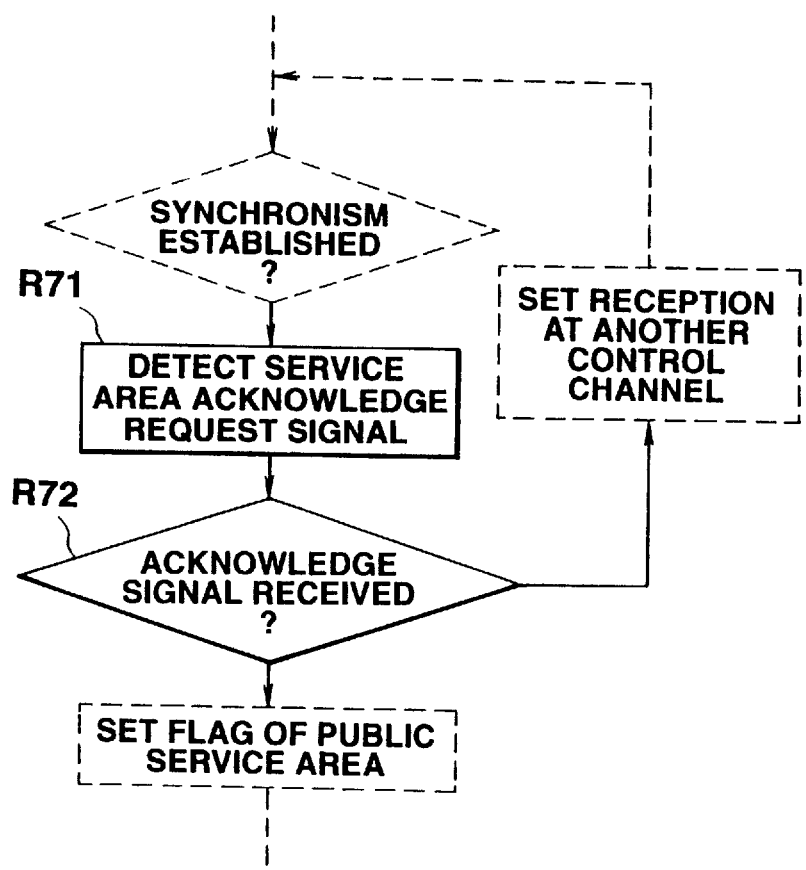
FIG. 18 is a flowchart for the processing operation of the controller of FIG. 13 from the time when a synchronized condition is established by the controller till a flag of a public service area is set up.

FIG. 18 illustrates a flowchart of the processes carried out from the time when a synchronized state is established until the time when a public flag is set up if the output level of the public radio base station is higher than that of the portable telephone set (e.g., if the public radio base station transmits various data).

Referring to FIG. 18, if it is found by scanning the reception frequency of public control channel that a synchronism is established at the public control channel, a signal is transmitted to the public radio base station to check if the portable telephone set is located within the service area of the public radio base station (step R71) and it is checked if there is any acknowledge signal from the public radio base station (step R72). If no acknowledge signal is found, the reception frequency is set at another control channel to check if a synchronism is established there. If an acknowledge signal is found, a flag of a public service area is set up.

Thus, whenever the above described portable telephone set of the second embodiment moves from out of the service area of the public or private radio base station into it, the speaker 26 for ringer is caused to sound and notify the user of the current situation so that the user may realize that he or she is now in the service area of the public or private radio base station without looking into the LCD 22.

Then, three different procedures for calling a subscriber from the portable telephone set that may be used when the latter moves from out of the public service area into it will be described. Note that the user can select any of these procedures by using a selection switch.

An automatic dialing process as a first procedure for calling a subscriber will be described by referring to the flowchart of FIG. 19.

Figure 19:
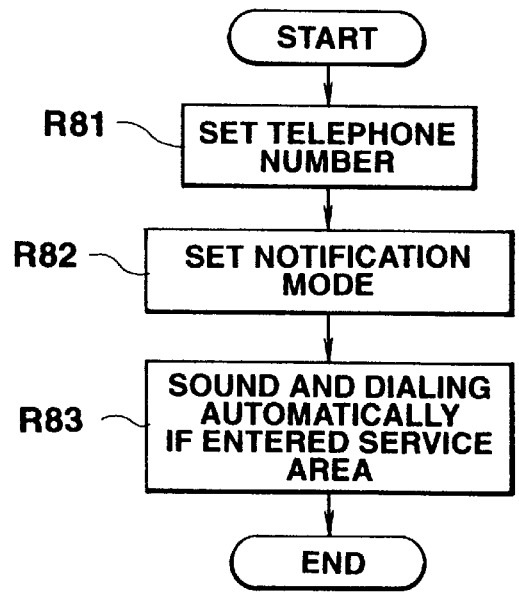
FIG. 19 is a flowchart for the operation of the controller of FIG. 13 to process an automatic dialing process.

Referring to FIG. 19, it is assumed that the telephone number of the destination telephone set is registered previously in the portable telephone set. When the number is selected by operating the key input section 42 (step R81), the notification mode is automatically selected (step R82). When the user moves from out of the service area of the public radio base station into it, the speaker 26 for ringer is caused to sound and notify the user of the fact that he or she is now in the service area of the public base station and the portable telephone set calls the destination telephone set by automatically dialing the registered and selected telephone number. Thus the process is terminate (step R83).

An automatic dialing process using a calling key as a second procedure for calling a subscriber will be described with reference to the flowchart of FIG. 20.

Figure 20:
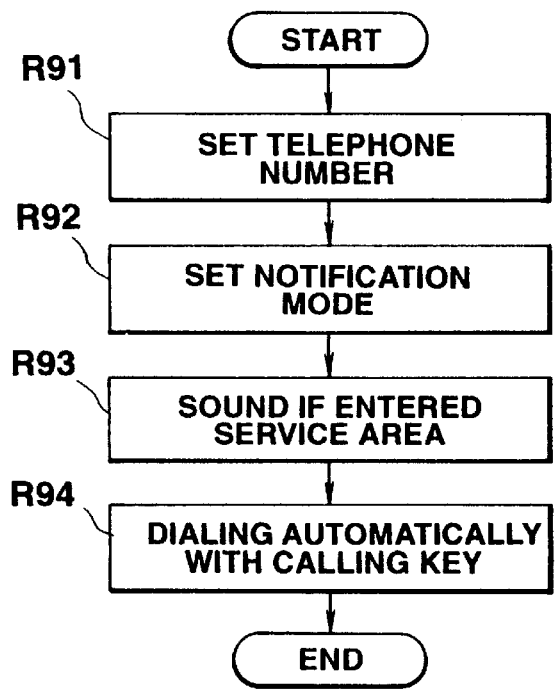
FIG. 20 is a flowchart for the operation of the controller of FIG. 13 to process an automatic dialing process involving the use of a calling key.

Referring to FIG. 20, it is also assumed that the telephone number of the destination telephone set is registered in advance in the portable telephone set. When that number is selected by operating the key input section 42 (step R91), the notification mode is automatically selected (step R92). the speaker 26 for ringer is caused to sound and notify the user of the fact that he or she is now in the service area of the public base station (step R93). When calling key is operated, the portable telephone set calls the subscriber by automatically dialing the registered and selected telephone number and thereafter the process is terminated (step R94).

An automatic dialling process using a photo sensor 43 arranged on the portable telephone set as a third procedure for calling a subscriber will be described below by referring to the flowchart of FIG. 21.

Figure 21:
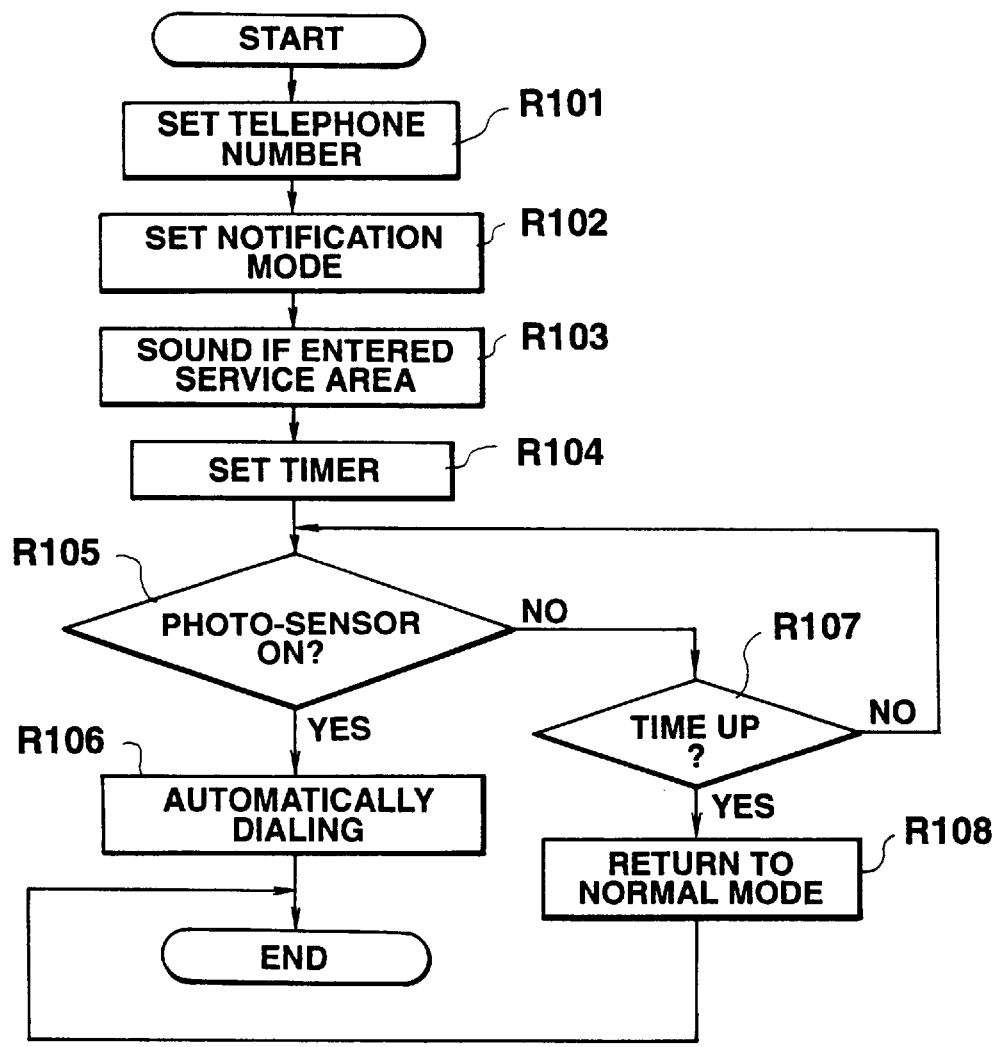
FIG. 21 is a flowchart for the operation of the controller of FIG. 13 to process an automatic dialing process involving the operation of a photo sensor.

In FIG. 21, it is also assumed that the telephone number of the destination telephone set is registered in the portable telephone set. When the number is selected by operating the key input section 42 (step R101), the notification mode is automatically selected (step R102). When the user enters the service area of the public radio base station, the speaker 26 for ringer is caused to sound and notify the user of the fact that he or she is now in the service area of the public base station (step R103).

Then, the timer is set (step R104). It is thereafter checked if the photo sensor 43 is made active when, for instance, the portable telephone set is taken out of the user's pocket, the user's bag or the like (step R105). If the photo sensor 43 is activated, the subscriber of the registered and selected telephone number is automatically called to thus terminate the process (step R106). If the photo sensor 43 is not activated, the operation of checking if the photo sensor is activated or not is repeated until the time period set in the timer is over (step R107). When the time is over, the process returns the portable telephone set to the normal mode (reception stand by mode) and terminates the process (step R108).

Thus, the control section 40 operates both the speaker 26 for ringer and the automatic calling function of the portable telephone set at the same time whenever the user moves from out of the service area of the related radio base station into it in order to fully exploit that function and make the user feel a sense of being well served.

While the above embodiment notifies the user with sound of the result of the process of checking if he is in or out of the service area of the related radio base station, the means of notification is not limited to sound, and, for instance, vibration or an electric current may alternatively be used.

(Third Embodiment)

FIGS. 22 through 28 illustrate a third embodiment of a portable telephone set according to the present invention that can be suitably used for a second generation cordless telephone system which is provided with a transceiver function.

Figure 22:
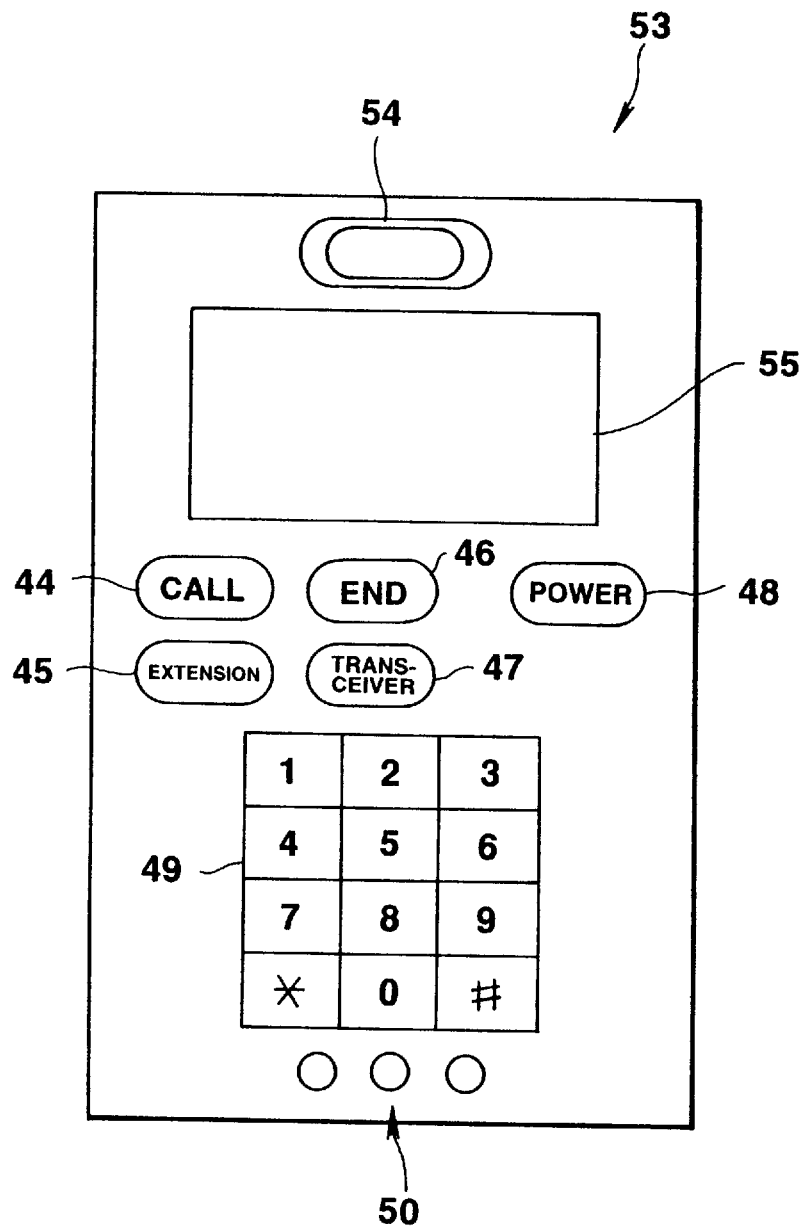
FIG. 22 is a schematic perspective view of a third embodiment of portable telecommunications apparatus used in a second generation cordless telephone system, said embodiment being provided with the function of a portable telephone set and a transceiver.
Figure 23:
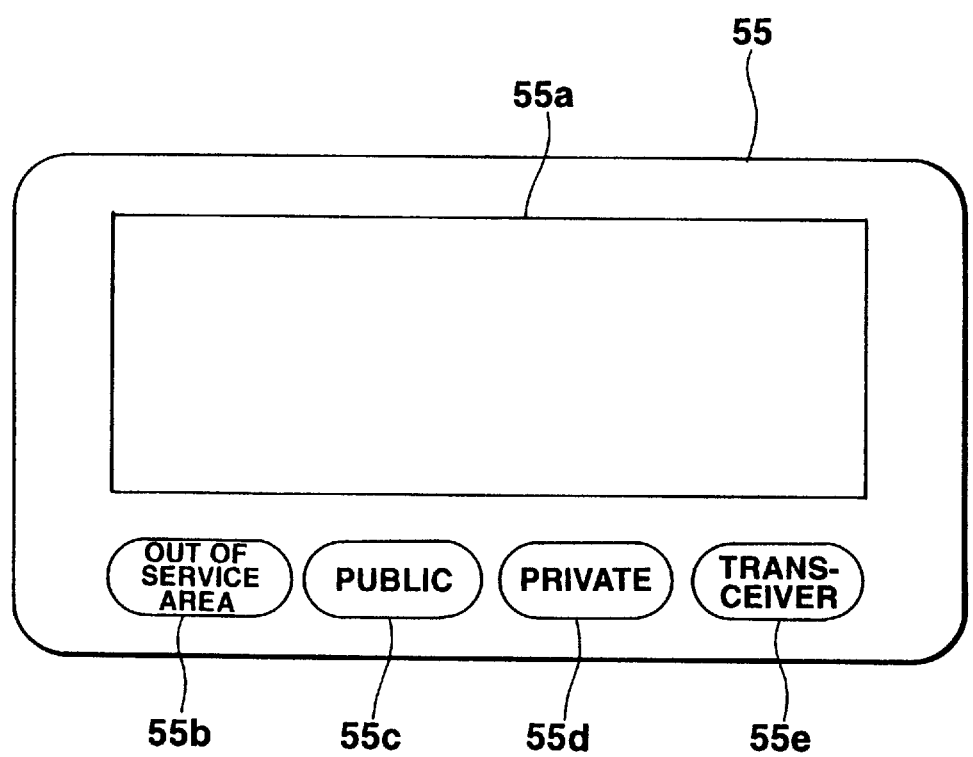
FIG. 23 is a schematic plan view of the display section of the third embodiment of FIG. 22.

FIG. 22 is a schematic perspective view of the portable telephone set 53. Referring to FIG. 22, the portable telephone set 53 comprises a speaker 54, an LCD 55, a call switch 44, an extension switch 45, an end of call switch 46, a transceiver switch 47, a power switch 48, a number of numerical keys 49 and a microphone 50. The speaker 54 is used to make the calling tone or the voice of the speaker at the other end of the radio communication line audible. As shown in FIG. 23, the LCD 55 has a display area 55a for showing the telephone number of the called party selected by means of the numerical keys 49 and other messages, an out-of service area message display area 55b, a public service area message display area 55c, a private reception area message display area 55d and a transceiver mode display area 55e. The call switch 44 has to be depressed for calling. The extension switch 45 needs to be depressed to connect the portable telephone set at home to the base station telephone set or some other portable telephone set affiliated to the base station set. The end of call switch 46 has to be depressed whenever a call is ended. The transceiver switch 47 is depressed to use a transceiver function for setting up a radio communication line with another portable telephone set without using a radio base station. The power switch 48 is used for power on/off operation on the portable telephone set. The numerical keys 49 are used to input telephone numbers of the destination telephone set etc. The microphone 50 is used to input voices used for telephone communication.

Figure 24:
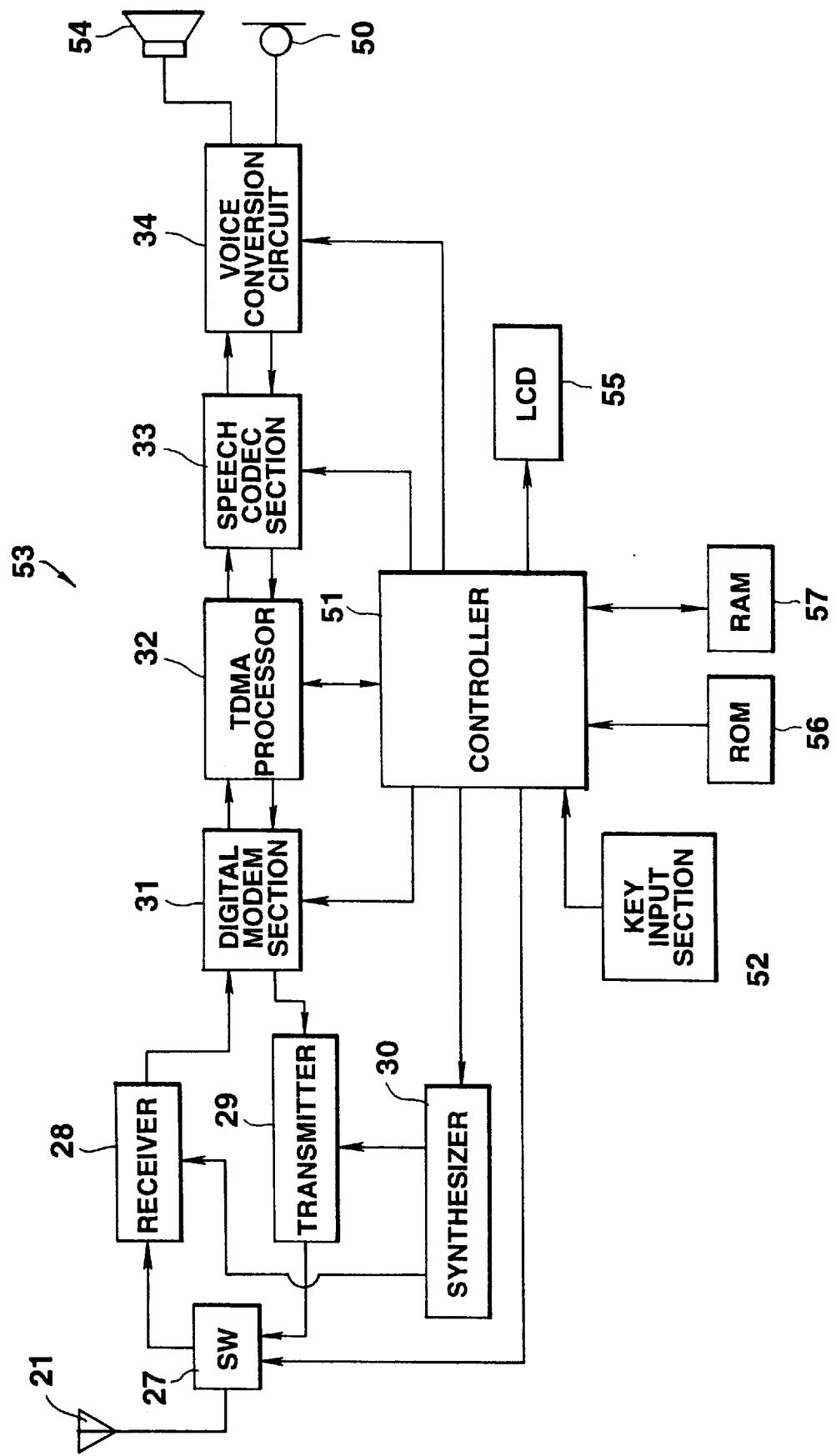
FIG. 24 is a block diagram of the embodiment of FIG. 22 when it operates as a portable telephone set.

FIG. 24 is a block diagram of the portable telephone set 53 of FIG. 22. Those components that are same as the corresponding ones of the embodiments of FIGS. 5 or 13 are respectively denoted by the same reference numerals and their descriptions are omitted here. Referring to FIG. 24, the portable telephone set 53 comprises an antenna 21, a switch 27, a receiver 28, a transmitter 29, a synthesizer 30, a digital MODEM section 31, a TDMA processor 32, a speech CODEC section 33, a voice conversion circuit 34, a speaker 54, a microphone 50, a controller 51, a key input section 52, a ROM 56, a RAM 57 and an LCD 55. The controller 51 executes the telecommunications control program stored in the ROM 56 for controlling the operation of the components of the portable telephone set and causes the LCD 55 to display the telephone number selected by means of the key input section 52. It also causes the speaker 54 to sound whenever there is a call and notify the user of the call. It also executes the periodical calling program stored in the controller 51 for setting up a radio line between the destination portable telephone set in the transceiver mode and causes the speaker 54 to sound whenever the portable telephone set and that of the destination portable telephone set is connected via a radio communication line and notify the user of the fact. As shown in FIG. 22, the key input section 52 comprises a call switch 44, an extension switch 45, an end of call switch 46, a transceiver switch 47, a power switch 48 and numerical keys 49 and notifies the controller 51 of the status of each key. The key input section 52 may additionally comprise a notification mode switch (not shown), with which the notification sound periodically produced by the control section 51 may be omitted.

Now the operation of the third embodiment will be described.

First, the operation of periodical calling process executed by the controller 51 in the transceiver mode will be described by referring to the flowchart of FIG. 25.

Figure 25:
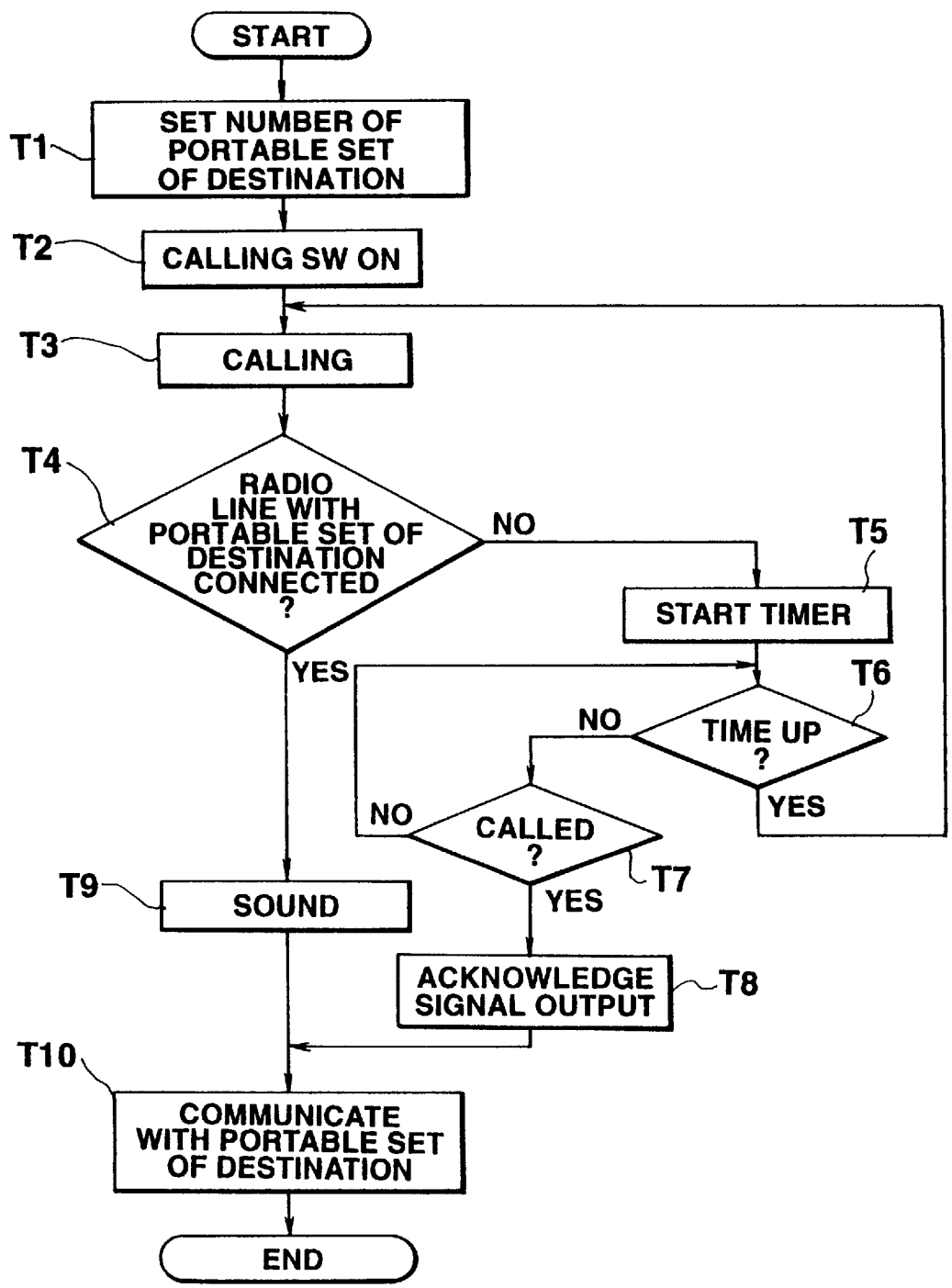
FIG. 25 is a flowchart of the operation of the controller of FIG. 24 to execute a periodical calling process.

Referring to FIG. 25, after the transceiver mode (transceiver reception ready mode) is selected by means of the transceiver switch 47, the ID number (the child set number) of the destination portable telephone set is selected by the user with the numerical keys 49 (step T1). When the call switch 44 is depressed (step T2), the transmitter 29 starts an operation of periodical calling, where it sends out a signal to the portable telephone set of the called party (step T3). Then, it is determined if the portable telephone set of the calling party and that of the called party are connected by a radio line (step T4). If not, the timer is started (step T5). It is checked if there is a call within the time period set in the timer (steps T6, T7). When the time period is over, the calling process and the determination process in steps T3 and T4 are repeated to send out a signal and determines if the portable telephone set of the calling party and that of the called party are connected by a radio line. If there is a call within the time period set in the timer, the transmitter 29 is caused to transmit an acknowledge signal (step T8) and the communication between the two parties is executed and then the process is completed (step T10).

If, on the other hand, the portable telephone set of the calling party and that of the called party are connected by a radio line in step T4, the speaker 54 is caused to sound and notifies the user of the fact (step T9). The process is terminated when the communication between the two parties is over (step T10).

With the above described operation of periodical calling in the transceiver mode, the user is not required to repeat the operation of checking if the portable telephone set of the destination is located within the service area of his or her portable telephone set, the transceiver function of the portable telephone set is fully exploited and the user is made to feel a sense of being well served.

Now, the stand-by process and the periodical calling process executed by the controller 51 in the transceiver mode will be described by referring to the flowcharts of FIGS. 26 and 27. Note that, while the portable telephone set is ready for receiving signals during the operation of periodical calling process illustrated in FIG. 25 if the transmitter 29 is not actually transmitting a signal, it is dedicated to calling and, therefore, not ready for signal reception during the operation of periodical calling process as illustrated in FIGS. 26 and 27.

Figure 26:
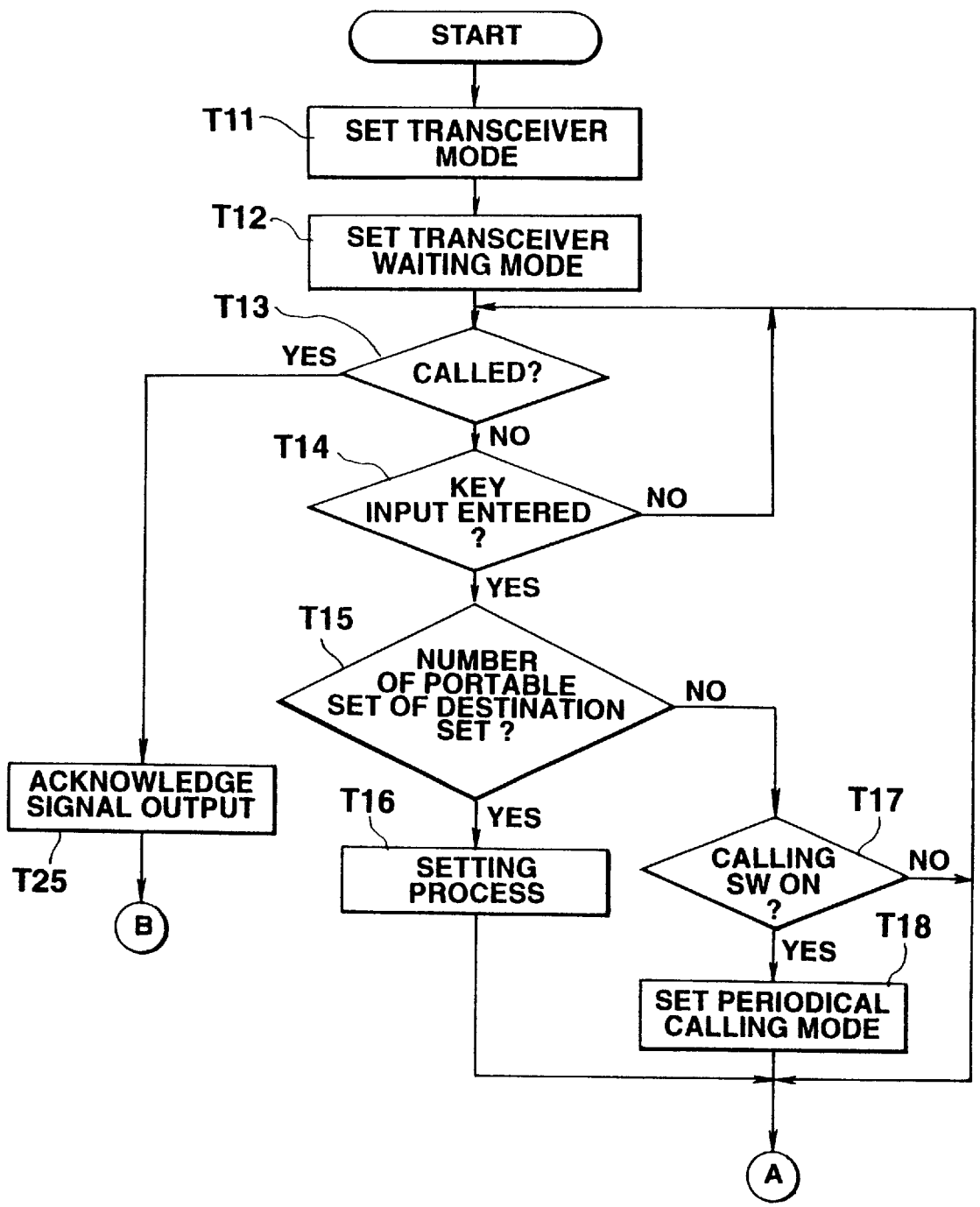
FIG. 26 is a flowchart of the operation of the controller of FIG. 24 to execute a stand-by process and a periodical calling process.
Figure 27:
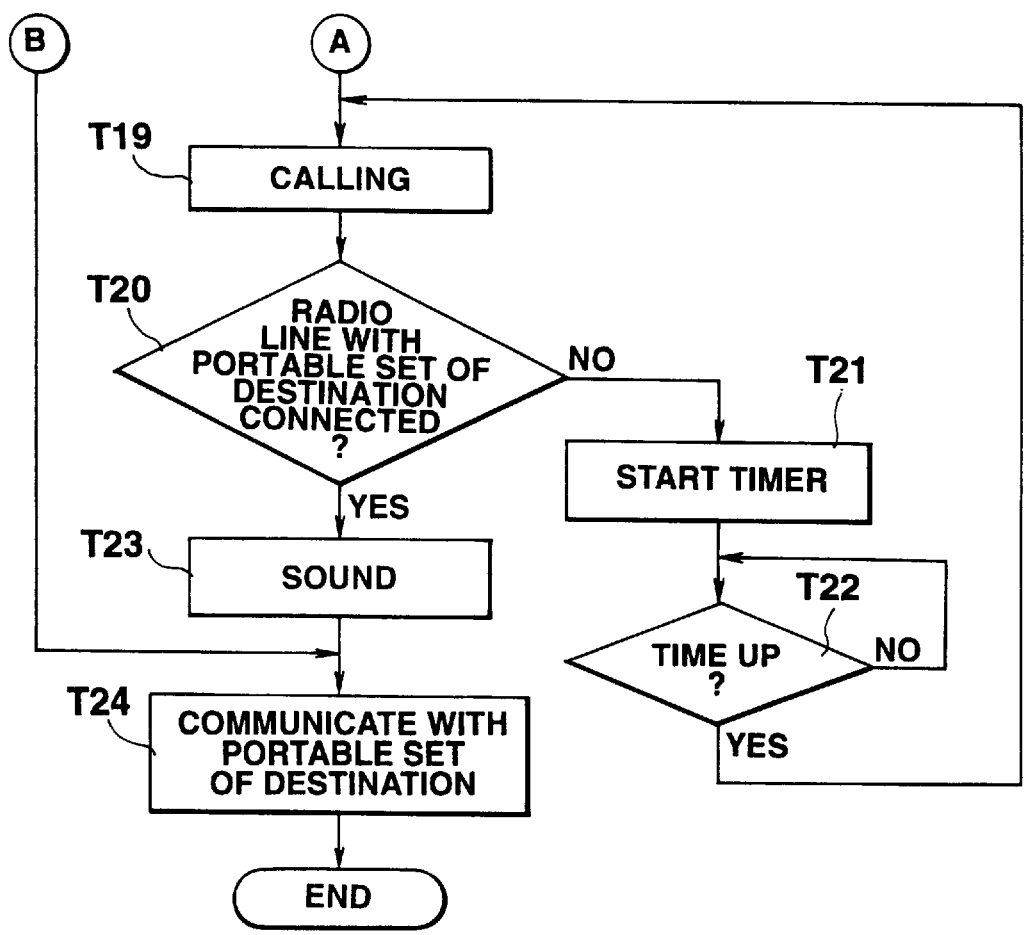
FIG. 27 is a flowchart of an alternative operation of the controller of FIG. 24 to execute a stand-by process and a periodical calling process.

Referring to FIG. 26, as the transceiver mode is selected by the user through the use of the transceiver switch 47 (step T11), the portable telephone set is held in a transceiver stand by mode (step T12). It is checked if there is a call (step T13). If there is not any call, it is checked if any key is depressed or not (step T14). If it is found that one or more than one key is depressed, it is checked if an ID number of the destination portable set is selected for transceiver communication or not (step T15). If the ID number is selected by the user via the numerical keys 49 for transceiver communication, the setting process is carried out in step T16 and then the process returns to step T13 to check if there is a call. If the ID number selected by the user is not that of the destination portable telephone set, it is checked if the call switch 44 is depressed or not (step T17). If not, the process goes back to step T13 to check if there is a call. If, on the other hand, it is found that the call switch 44 is depressed in step T17, the periodical calling mode is selected (step T18).

Subsequently, in FIG. 27, a calling signal for calling the portable telephone set of the destination is transmitted (step T19) it is determined if the portable telephone set of the called party and that of the calling party are connected by a radio line as a result of the periodical calling process (step T20). If not, the timer is started (step T21). If the time period set in the timer expires (step T22), the operation of steps T19 and T20 are repeated to transmit a signal for calling the destination portable set and determine if the portable telephone set of the calling party is connected to that of the called party via a radio line. Once the portable telephone sets of the two parties are connected with a radio line, the speaker is caused to sound and notify the user of the situation (step T23). After the radio communication of the two parties is over, the entire operations are terminated (step T24).

If, on the other hand, if it is found in step T13 that there is a call, the transmitter 29 is caused to transmits an acknowledge signal (step T25). After the radio communication of the two parties is over, the entire operations are terminated (step T24).

Thus, the portable telephone set of the third embodiment provided with a transceiver function periodically and automatically transmits a signal to call the destination portable set and, as soon as the destination portable set is found within the service area of the embodiment, notifies the user of the situation with sound so that the user is free from the cumbersome operation of repeatedly calling the destination portable set and made to feel a sense of being well served.

The embodiment will be particularly advantageous when the user wants to meet the destination portable set because he or she can easily find out where the destination portable set is located.

While the above embodiment is designed to sound as soon as it and the portable telephone set of the destination is connected with a radio line, the means of notifying the user is not limited to sound but vibration or a weak electric current generated by a current generator may alternatively be used.

Figure 28:
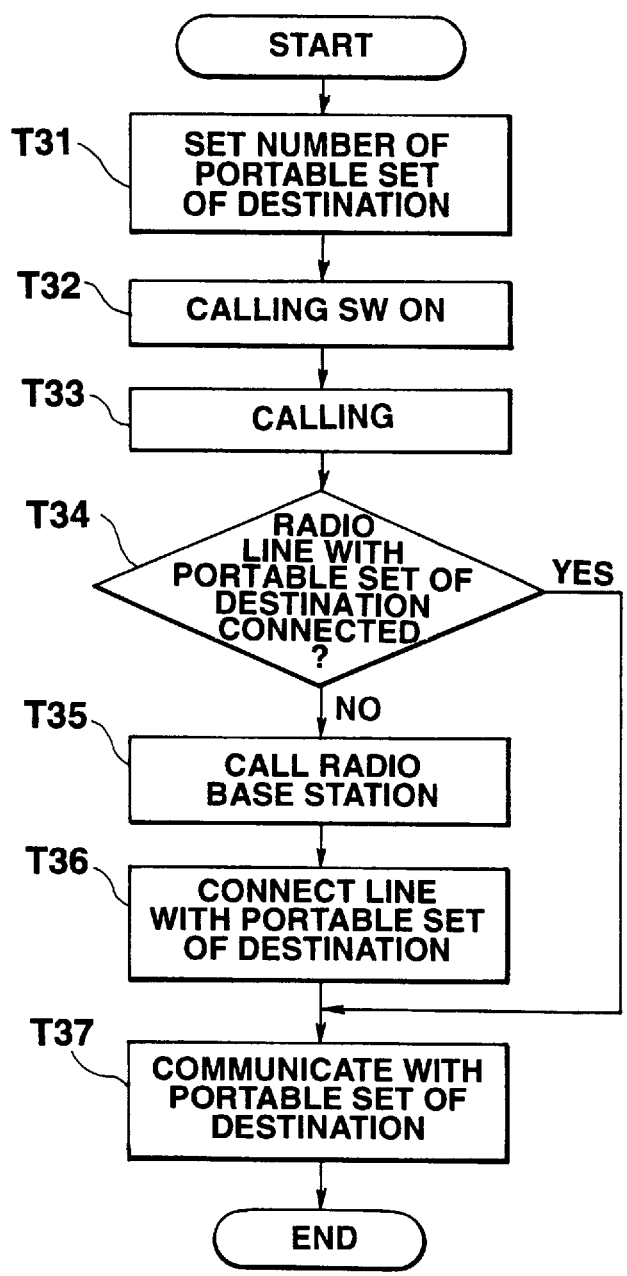
FIG. 28 is a flowchart of the operation of the controller of FIG. 24 to execute any other calling process.

FIG. 28 shows a flowchart of an alternative operation of signal transmission that may be carried out by the control section 51 of the above embodiment in the transceiver mode. Note that the ID number of the portable telephone set of the destination is stored in the RAM 57 along with the telephone number of the portable telephone set of the destination (or the telephone number of the base station set of the destination portable set).

Referring to FIG. 28, under the condition where the transceiver mode is selected by depressing the transceiver switch 47, if the ID number of the portable telephone set of the destination is selected by the user by way of the numerical keys 49 (step T31) and the call switch 44 is depressed (step T32), the transmitter 29 starts sending a signal to call the portable telephone set of the destination (step T33). It is then determined if the portable telephone set of the calling party and that of the called party are connected with a radio line (step T34). If yes, the entire operations are terminated as soon as the conversation between the two parties is completed (step T37).

If, on the other hand, it is determined in step T34 that the portable telephone sets of the two parties are not connected with a radio line, then the transmitter 29 is caused to transmit a signal to the radio base station in step T35 (or call the base station telephone set of the called portable telephone set by the telephone number).

As the portable telephone set of the calling party and the portable telephone set of the called party are connected with a radio line in step T36, the entire operations are terminated as soon as the communication between the two parties is completed (step T37).

Note that, while the third embodiment transmits a signal to the radio base station once it is determined in step T34 that it is not connected to the portable telephone set of the called party with radio line in the above description, it may alternatively be so designed as to transmit a signal when the call switch 44 is depressed for another time.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A portable telecommunications apparatus capable of communicating with a destination communication apparatus through a radio telecommunications channel, comprising:

a detector which detects if the portable telecommunication apparatus has entered a service area of the destination communication apparatus;

a sound generator which notifies a user by a sound when it is detected by the detector that the portable telecommunications apparatus has entered the service area of the destination communication apparatus; and a sounding mode setting device which sets a sounding mode in which the sound is generated by said sound generator when it is detected by the detector that the portable telecommunication apparatus has entered the service area of the destination communication apparatus;

wherein said destination communication apparatus is a public radio base station connected to a telecommunications network; and said portable telecommunication apparatus is a portable telephone set capable of setting up a radio telecommunications channel with said public radio base station and provided with a setting device for setting a telephone number and a photo-sensor for sensing light so that said portable telecommunications apparatus calls the telephone number set by said setting device when said photo-sensor detects light within a predetermined period of time after detection of when the start where the portable telecommunication apparatus is located in the service area of said destination communication apparatus.

2. A portable telecommunications apparatus according to claim 1, wherein said detector detects a situation where the portable apparatus is located in the service area of said destination communication apparatus by receiving the control information transmitted from said destination communication apparatus via a radio line.

3. A portable telecommunications apparatus according to claim 1, wherein said portable telecommunications apparatus comprises a transmitter for periodically transmitting a call signal to call said destination telecommunications apparatus, said destination telecommunications apparatus comprises a transmitter for transmitting an acknowledge signal when it receives said call signal, and said detector detects a situation where the portable apparatus is located in the service area of said destination communication apparatus by receiving said acknowledge signal.

4. A portable telecommunications apparatus according to claim 3, wherein said portable telecommunications apparatus sets up a telecommunications line with said destination communication apparatus when said detector detects a situation where the portable apparatus is located in the service area of said destination communication apparatus by receiving said acknowledge signal.

5. A portable telecommunications apparatus according to claim 1 wherein said a portable telephone set is provided with a direct communication function of directly transmitting radio signals to and receiving radio signals from a destination portable telephone set.

6. A portable telecommunications apparatus according to claim 1, wherein said portable telephone set is provided with a direct communication function of directly transmitting radio signals to and receiving radio signals from a destination portable telephone set.

7. A portable telecommunications apparatus according to claim 1, wherein said portable telephone set is then provided with a direct communication function of directly transmitting radio signals to and receiving radio signals from a destination portable telephone set and capable of setting up a telecommunications channel with a public radio base station connected to a telecommunications network.

8. A portable telecommunications apparatus according to claim 1, wherein said portable telephone set is then provided with a direct communication function of directly transmitting radio signals to and receiving radio signals from a destination portable telephone set and capable of setting up a telecommunications channel with a base station telephone set or a public radio base station connected to a telecommunications network.

9. A portable telecommunication apparatus according to claim 1, wherein said sounding mode setting device is manually operable to set the sounding mode.

10. A portable telecommunications apparatus capable of communicating with a destination communication apparatus through a radio telecommunications channel, comprising:
   a detector which detects if the portable telecommunication apparatus has entered a service area of the destination communication apparatus;
   a sound generator which notifies a user by a sound when it is detected by the detector that the portable telecommunications apparatus has entered the service area of the destination communication apparatus; and
   a sounding mode setting device which sets a sounding mode in which the sound is generated by said sound generator when it is detected by the detector that the portable telecommunication apparatus has entered the service area of the destination communication apparatus;
   wherein:
      said destination communication apparatus comprises a public radio base station connection to a communication network;
      said portable telecommunications apparatus comprises a portable telephone set capable of establishing a radio communication channel between said portable telephone set and said public radio base station;
      said portable telephone set includes a telephone number setting device which sets a desired telephone number, and a call instructing device which instructs said portable telephone set to call the desired telephone number; and
      the sounding mode is set in said sounding mode setting device in response to setting the desired telephone number in said telephone number setting device.

11. A portable telecommunications apparatus capable of communicating with a destination communication apparatus through a radio telecommunications channel, comprising:
   a detector which detects if the portable telecommunication apparatus has entered a service area of the destination communication apparatus;
   a sound generator which notifies a user by a sound when it is detected by the detector that the portable telecommunications apparatus has entered the service area of the destination communication apparatus; and
   a sounding mode setting device which sets a sounding mode in which the sound is generated by said sound generator when it is detected by the detector that the portable telecommunication apparatus has entered the service area of the destination communication apparatus;
   wherein said destination telecommunications apparatus is a public radio base station connected to a telecommunications network, said portable telecommunications apparatus is a portable telephone set capable of setting up a radio telecommunications channel with said public radio base station and provided with a setting device which sets a telephone number so that said portable telecommunications apparatus calls the telephone number set by said setting device when said detector detects a situation where the portable apparatus is located in the service area of said destination apparatus; and
   wherein the sounding mode is set in said sounding mode setting device in response to setting the telephone number in said setting device.

12. A portable telephone apparatus according to claim 1, wherein the sounding mode is set in said sounding mode setting device in response to setting the telephone number in said setting device.

* * * * *

UNITED STATES PATENT AND TRADEMARK OFFICE
CERTIFICATE OF CORRECTION

PATENT NO. : 5,832,386
DATED : November 3, 1998
INVENTOR(S) : Nojima et al.

It is certified that error appears in the above-identified patent and that said Letters Patent is hereby corrected as shown below:

On the Title Page, under Item [19] (Heading), after "Nojima" delete, "et al.";

under Item [75] Inventors, after "Tachikawa"

delete "; Noboru Yumoto, Fussa, both of"

and insert --,--.

Signed and Sealed this

Twenty-eighth Day of September, 1999

Attest:

Q. TODD DICKINSON

*Attesting Officer*      *Acting Commissioner of Patents and Trademarks*